(12) United States Patent
Hafenrichter et al.

(10) Patent No.: US 12,520,980 B2
(45) Date of Patent: Jan. 13, 2026

(54) ELECTRICAL DEVICE, IN PARTICULAR SUCTION DEVICE OR MACHINE TOOL

(71) Applicant: Festool GmbH, Wendlingen (DE)

(72) Inventors: Rainer Hafenrichter, Buch (DE); Jan Kopf, Ulm (DE)

(73) Assignee: FESTOOL GMBH, Wendlingen (DE)

( * ) Notice: Subject to any disclaimer, the term of this patent is extended or adjusted under 35 U.S.C. 154(b) by 433 days.

(21) Appl. No.: 17/890,326

(22) Filed: Aug. 18, 2022

(65) Prior Publication Data

US 2023/0076422 A1 Mar. 9, 2023

(30) Foreign Application Priority Data

Aug. 20, 2021 (DE) .................. 10 2021 121 708
Nov. 12, 2021 (DE) .................. 10 2021 129 515

(51) Int. Cl.
*A47L 9/28* (2006.01)
*A47L 9/22* (2006.01)
*H02J 7/00* (2006.01)

(52) U.S. Cl.
CPC ............... *A47L 9/2884* (2013.01); *A47L 9/22* (2013.01); *H02J 7/0013* (2013.01); *H02J 7/0045* (2013.01)

(58) Field of Classification Search
CPC ........ A47L 9/2884; A47L 9/22; A47L 9/2868; A47L 9/2878; A47L 11/4005; A47L 5/36;

(Continued)

(56) References Cited

U.S. PATENT DOCUMENTS

2008/0062618 A1* 3/2008 Frank ................. H01M 50/296
361/600
2013/0239360 A1* 9/2013 Hensel ................. A47L 9/2884
15/347

(Continued)

FOREIGN PATENT DOCUMENTS

DE 10 2005 007 923 A1 8/2006
DE 10 2010 043 577 A1 5/2012

(Continued)

OTHER PUBLICATIONS

European Search Report of Jan. 18, 2023.

*Primary Examiner* — David S Posigian
*Assistant Examiner* — Michael A Gump
(74) *Attorney, Agent, or Firm* — Hoffmann & Baron, LLP

(57) ABSTRACT

An electrical device, in particular in the form of a suction device (10) or a machine tool, with a housing (20) in which at least one electrical load, in particular an electric drive motor (11D), is arranged, wherein the electrical device has a power supply unit (80) with an energy storage receptacle (81), for the electrical power supply of the electrical load, in particular the drive motor (11D), in the interior of which at least two device interfaces (90A, 90B) for the detachable connection of a respective energy storage interface (190A, 190B) of an electrical energy storage (170A, 170B), in particular a battery pack, are arranged. The device interfaces (90A, 90B) are arranged on opposite side walls (83, 84) of the energy storage receptacle (81), so that the energy storages (170A, 170B) can be arranged on the device interfaces (90A, 90B) with mutually facing bottom walls (175).

21 Claims, 10 Drawing Sheets

(58) Field of Classification Search
CPC ........ A47L 5/365; A47L 5/362; H02J 7/0013; H02J 7/0045; B25F 5/02; B25H 3/02; H01M 50/269
USPC .......................................................... 15/339
See application file for complete search history.

(56) References Cited

U.S. PATENT DOCUMENTS

| | | | |
|---|---|---|---|
| 2015/0223652 A1* | 8/2015 | Koura | A47L 5/365 15/327.2 |
| 2018/0103811 A1* | 4/2018 | Gregorich | A47L 9/009 |
| 2018/0235418 A1 | 8/2018 | Lauer | |
| 2019/0334302 A1* | 10/2019 | Maier | H01R 13/113 |
| 2020/0023383 A1* | 1/2020 | Grebing | A47L 7/0095 |
| 2022/0021034 A1* | 1/2022 | Wang | H01M 10/4207 |

FOREIGN PATENT DOCUMENTS

| | | |
|---|---|---|
| DE | 11 2013 006 568 T5 | 11/2015 |
| DE | 20 2020 105 705 U1 | 12/2020 |

\* cited by examiner

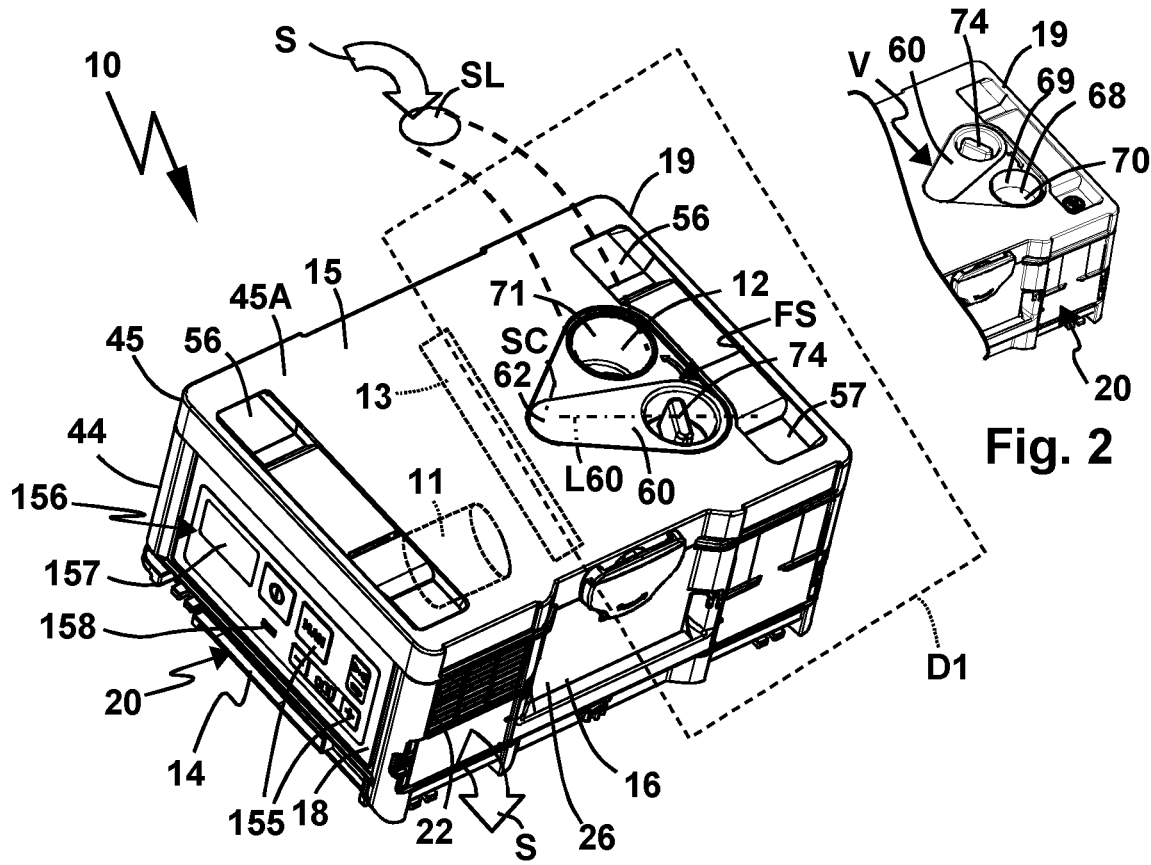
Fig. 1
Fig. 2
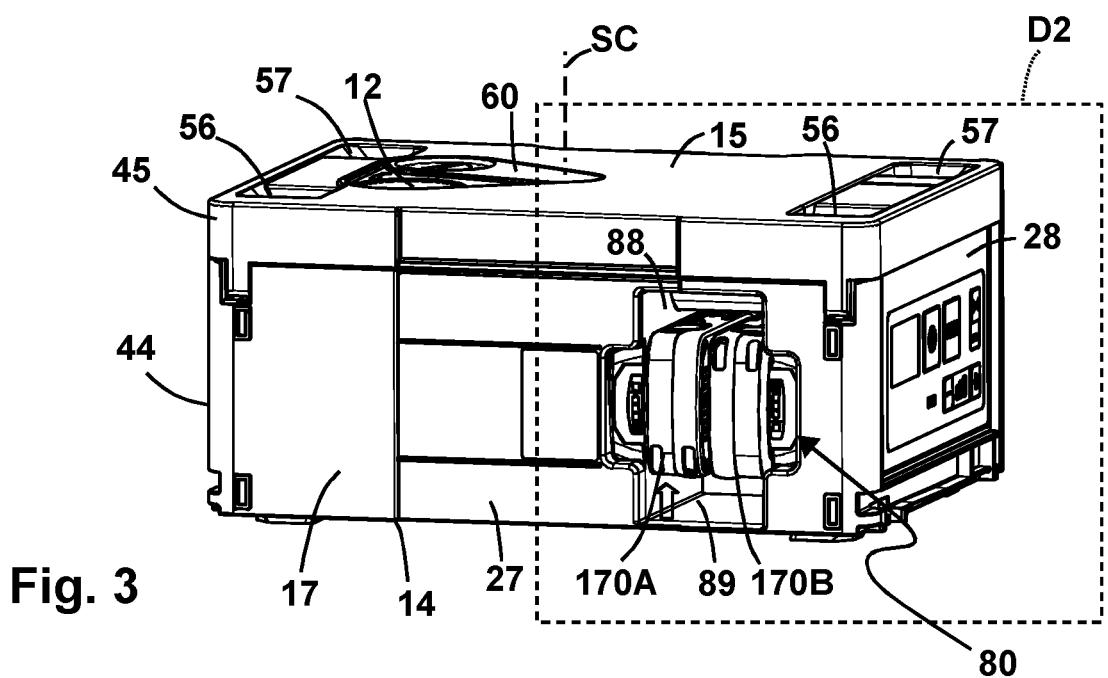
Fig. 3

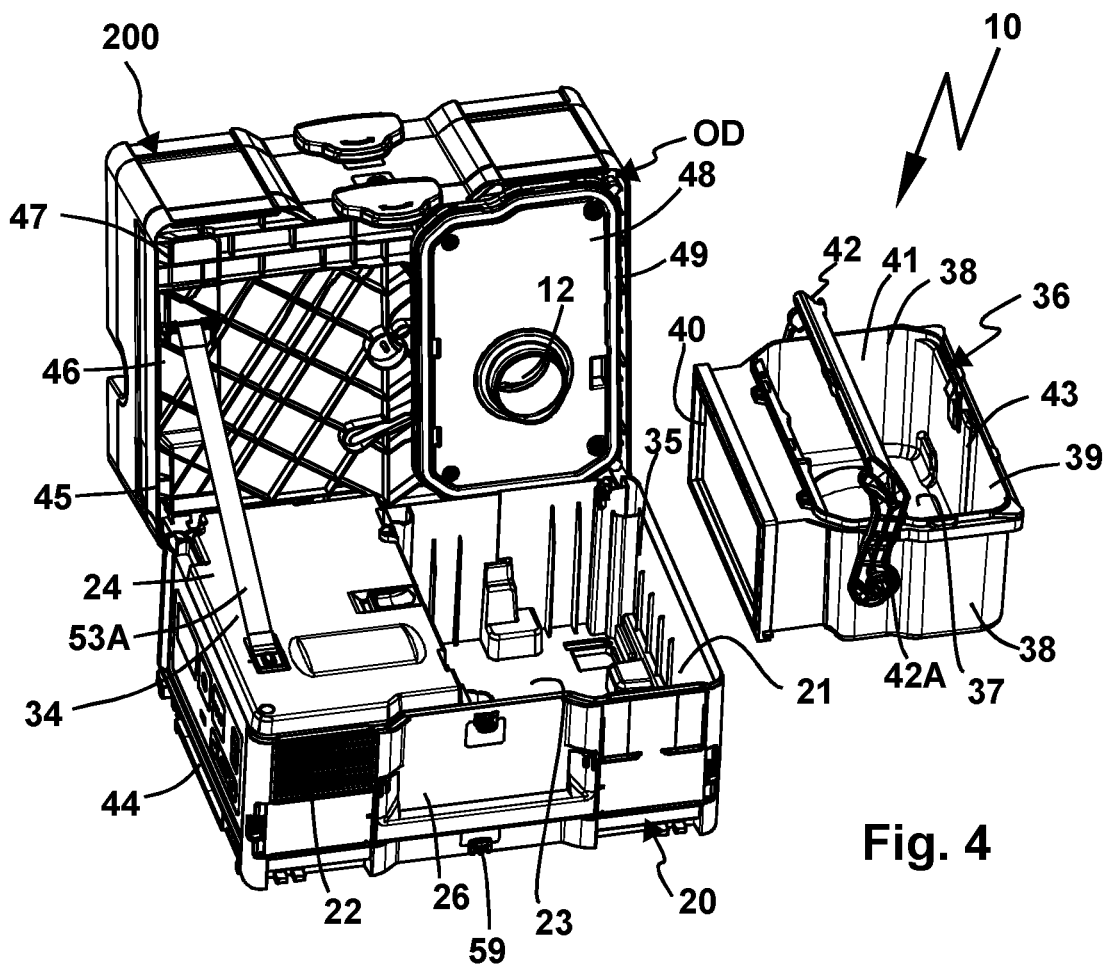
Fig. 4
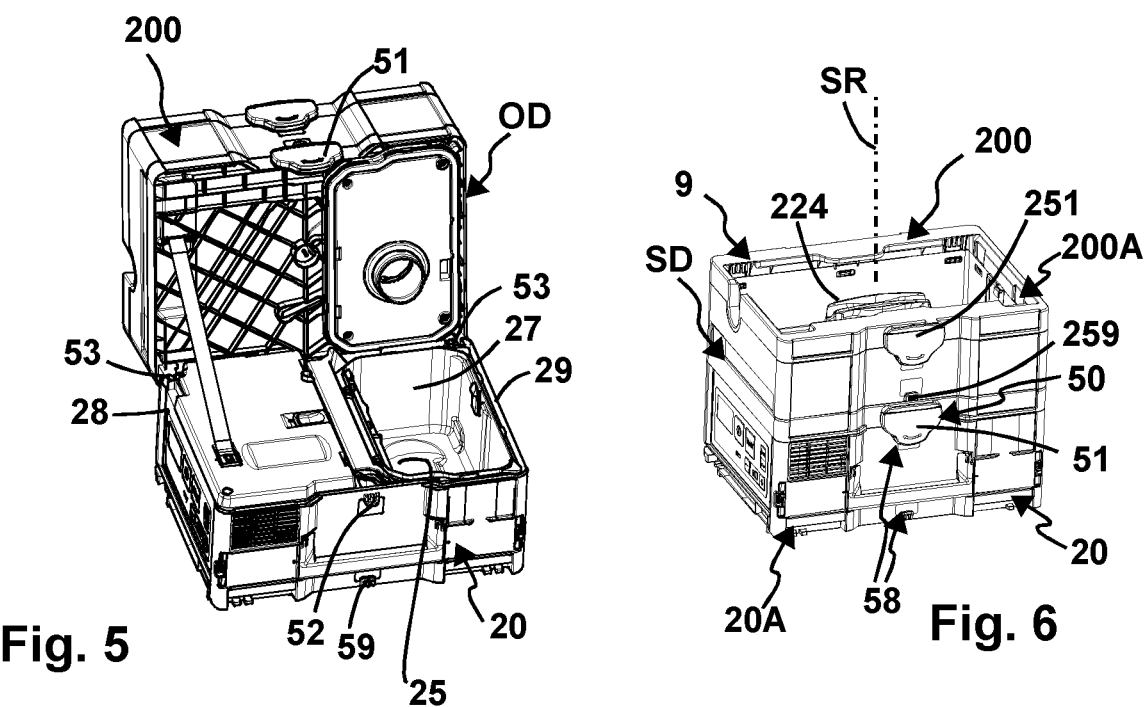
Fig. 5
Fig. 6

ELECTRICAL DEVICE, IN PARTICULAR SUCTION DEVICE OR MACHINE TOOL

BACKGROUND OF THE INVENTION

The invention relates to an electrical device, e.g. in the form of a suction device or a machine tool and/or as a mobile electrical device, with a housing in which at least one electrical load, in particular a drive motor, is arranged, wherein the electrical device has a power supply unit with an energy storage receptacle, in the interior of which at least two device interfaces are arranged for the detachable connection of an energy storage interface of an electrical energy storage device, in particular a battery pack, for the electrical power supply of the electrical load, in particular the drive motor.

The energy storages are, for example, so-called battery packs, which can be detachably connected to the electrical device, e.g. the suction device or the machine tool, in particular a hand-held machine tool. In electrical devices of this type, in order to increase the mobility and/or the electrical power, it is necessary for several, for example two, such energy storages to be available for energy delivery at the same time. However, the electrical power density of rechargeable energy storages is still so low that they are relatively bulky. Accordingly, the energy storages receptacle must have a large receiving volume, such that the energy storages can still be grasped by an operator, for example to remove them from the energy storages receptacle.

SUMMARY OF THE INVENTION

It is therefore the object of the present invention to provide an improved concept for arranging energy storages on a housing of a mobile or stationary electrical device of said type, for example.

To solve the problem, in an electrical device, in particular in the one or a suction device or in the machine tool of aforementioned kind, it is provided that the device interfaces are arranged on mutually opposite side walls of the energy storage receptacle, such that the energy storages may be arranged on the device interfaces with bottom walls facing each other.

The advantage of such an arrangement can be seen in particular in the fact that the energy storages are arranged so to speak in a bottom to bottom or bottom wall to bottom wall configuration, so that a region of the energy storage receptacle extending next to the bottom walls is available as an operating space for actuating or operating the energy storages. It is true that the work required for laying electrical lines to the device interfaces within the housing is greater. In contrast, however, there is a significantly increased ease of use.

Advantageously, the electrical device is a mobile electrical device. The invention may however be easily used in stationary electrical devices.

The electrical energy storages contain a plurality of battery cells, for example. The battery cells are arranged in a housing of the respective energy storage in a side-by-side series arrangement, for example. The battery cells are connected in series and/or parallel to each other.

The electrical energy storages are preferably rechargeable electrical energy storages. In order to charge a respective energy storage, it can be removed from the energy storage receptacle. The energy storage can be connected to a charging device for electrical charging, for example, with its energy storage interface.

The battery cells have, for example, cylindrical housings or a cylindrical shape. The battery cells are arranged, for example, in one or more layers within an energy storage housing of energy storage.

The energy storage interfaces of the preferably mobile electrical device are connected, for example, in series or in parallel with one another, so that, for example, a supply voltage provided by the energy storages is added in a series connection. For example, if the energy storage interfaces are connected in parallel, the current available is higher.

Other energy storages can also be readily arranged at the energy storage interface. The additional energy storages can likewise be held in or on the energy storage interface with the bottom walls facing one another.

However, it is also possible for the electrical device, which is stationary or mobile, for example, to have energy storage interfaces which are not arranged on opposite side walls of the energy storage receptacle.

Furthermore, the electrical device can also have at least one additional energy storage receptacle, in which energy storage interfaces are provided, for example, which are arranged on opposite sides of a retaining wall of the energy storage receptacle. The at least one energy storage receptacle can also only have a single energy storage interface for connecting a single energy storage. The at least one additional energy storage receiving channel can be configured as a receiving pocket, receiving compartment or the like.

If the electrical device is a mobile electrical device, it retains its mobility, so to speak, because it is not dependent on a network interface.

In the case of the mobile or stationary electrical device, there are a number of energy storage devices, namely at least two energy storage devices, for an adequate energy supply.

The electrical load is preferably an electric drive motor. However, as an electrical load, the electrical device can also include, for example, a charging interface for charging a further electrical energy storage. For example, the housing has a housing interior in which the charging interface for charging the additional electrical energy storage is arranged.

The machine tool is a sawing machine, a milling machine or the like, for example.

It is advantageously provided that the energy storage receptacle has an insertion opening through which the energy storage can be inserted into the energy storage receptacle. An expansion of the insertion opening is preferably suitable for inserting an energy storage into the energy storage receptacle or for removing it from the energy storage receptacle, while the other energy storage is arranged in the energy storage receptacle. It is advantageous if the insertion opening is arranged on an outer wall of the housing.

In principle, it is conceivable that the energy storage receptacle has an opening on a side opposite the insertion opening, so that a type of passage is present, for example. Such a passage or a passage opening is suitable in particular for cooling the energy storage device arranged in the energy storage device receptacle.

The energy storage receptacle is preferably designed as a pocket or compartment on an outer wall of the housing.

It is preferably provided that the energy storage receptacle has such a depth that the energy storages do not protrude or only protrude to a maximum of 10% of their length in front of the energy storage receptacle and/or an outer contour of the housing when the energy storages are received in the energy storage receptacle. It is therefore advantageous if the energy storage or the energy storages can, so to speak, fully engage in the energy storage receptacle and/or do not protrude in front of a wall, in particular not in front of an outer wall of the housing, on which the energy storage receptacle is arranged.

It is advantageously provided that the device interfaces have longitudinal guide contours for guiding engagement of longitudinal guide contours of the energy storage interfaces along insertion axes. The longitudinal guide contours comprise, for example, guide slots and guide projections, which respectively extend along the insertion axes.

The insertion axes can be parallel to one another. However, it is also possible for the insertion axes to be arranged at an angle to one another, preferably at a small angle of at most 30°, in particular at most 20°, particularly preferably at most 10° or even more preferably at most 5°.

Provision is preferably made for device interfaces to also have gripping contours which interact with counter-gripping contours of the energy storage interfaces, so that the energy storage devices, when they are arranged on the device interfaces, are held on the device interfaces in a form-fitting manner transverse to their respective insertion axes. For example, the rear gripping contours include retaining projections that extend transversely to the respective insertion axis and that can be brought into or out of engagement with one another by a sliding actuation parallel to the insertion axis.

It is also advantageously provided that the device interfaces comprise latching devices for latching of latching devices of the energy storage interfaces. The latching devices comprise, for example, one or more latching receptacles. The energy storage interfaces have latching devices which are complementary to the latching devices of the device interfaces, such as at least one latching projection.

The device interfaces of the electrical device preferably include contact arrangements for establishing electrical connections to contact arrangements of the energy storage interfaces of the energy storage. These contact arrangements of the device interfaces and/or the energy storage interfaces include, for example, energy supply contacts and/or data contacts.

The contact arrangements include, for example, spring contacts, contact tongues or the like.

Provision is preferably made for the contact arrangements of the energy storage interfaces and the device interfaces to come into electrical contact with one another when the energy storage devices are plugged into the device interfaces.

It is advantageous if all the contacts of a contact arrangement of a device interface are arranged on that side wall and/or on a single side wall on which the device interface is arranged.

The power supply contacts serve to supply electrical power to the at least one electrical load, in particular the drive motor, of the electrical device.

The data contacts of the device interfaces are used for data transmission from the energy storage to the electrical device and/or vice versa. The data contacts are e.g. connected to a control of the electrical device, through which the control of the electrical device receives information, for example, regarding a charging status and/or a voltage of the respective energy storage from the energy storage. The energy storage may also comprise a control.

A respective control of the energy storage and/or the electrical device comprises, for example, one or more processors and memories, in which, for example, a control program for controlling the electrical device is stored and a control program for controlling the energy storage, for example a charging program, for the energy storage is saved.

The respective control of the electrical device or energy storage is designed to execute program code of the respective control program.

The energy storage receptacle can be open, for example, on a side that extends between the side walls. However, the energy storage receptacle is preferably completely surrounded by peripheral walls. The peripheral walls extend from the insertion opening into an interior space of the housing.

Provision is preferably made for the energy storage receptacle to have connecting walls which extend between the opposite side walls and delimit an interior space for accommodating the energy storage. The connecting walls are e.g. cover walls or bottom walls. The connecting walls and the side walls form, for example, peripheral walls of the energy storage receptacle.

It is advantageous if an operating space for gripping the energy storage device is provided between at least one connecting wall and the opposite energy storage device when the energy storage device is accommodated in the energy storage device receptacle. This means that the energy storage device can be gripped and/or operated from the side, for example.

Provision is preferably made for the operating space to have a width corresponding to the finger of an adult and/or a width of at least 1.5 cm, preferably at least 2 cm. The operator can therefore reach into the operating space with his fingers, for example in order to grasp the respective energy storage with a clamp-like grip.

Due to the energy storage accommodated, so to speak, bottom to bottom in the energy storage receptacle, the following advantageous configuration, which can be implemented without further ado, is also possible.

Provision is preferably made for the operating space to extend continuously between the side walls of the energy storage receptacle. The operating space preferably has a constant height between the side walls. However, it is also possible for the operating space to have a greater width in the area of the floor walls or near the floor walls than near the side walls. Even then, it is easily possible for an operator to engage in the operating space in order to selectively actuate one or the other energy storage device or both energy storage devices at the same time.

An advantageous concept provides that between each connecting wall and the energy storage opposite it, an operating space is arranged, through which the energy storage can be gripped like a clamp on opposite longitudinal sides when the energy storage is received in the energy storage receptacle. With this configuration in particular, a clamp-like grip for grasping the energy storage is easily possible.

A preferred embodiment provides that between each connecting wall and the energy storage device opposite it, an operating space is arranged through which the energy storage device can be gripped like a clamp on opposite longitudinal sides when the energy storage device is accommodated in the energy storage device receptacle. For example, the operator can grip the energy storage like a pair of tongs or clamps and pull it out of the energy storage receptacle.

It is also advantageous if the energy storage device has an operating element on at least one longitudinal side, which engages in the energy storage device receptacle when the energy storage device is received in the energy storage receptacle. The control element is used, for example, to adjust the latching device of the energy storage from the latched position holding the energy storage on the device interface to a latched-release position in which the energy storage can be detached from the device interface, for example by pulling actuation along the insertion axis.

It is advantageous if such an operating element is arranged on opposite sides, in particular longitudinal sides, of the energy storage.

A preferred embodiment provides that the electrical device forms a suction device. In this case, the housing forms a suction device housing, in the interior of which a suction turbine for generating a suction flow is arranged, the suction device housing having a suction inlet for admitting the suction flow and a dust collection chamber for collecting dust contained in the suction flow, wherein between the dust collection chamber and a suction turbine inflow opening of the suction turbine a filter element for retaining dust is arranged in the dust collection chamber.

The insertion opening is advantageously arranged on an outer wall of the housing, in particular of the suction device housing, of the electrical device, which extends between a bottom wall and a top wall.

The housing of the electrical device, which is formed, for example, by a suction device housing, is preferably designed as a stacking housing designed to form a housing stack extending in the direction of a stacking axis, under which at least one stacking container can be stacked and/or on which at least one stacking container can be stacked. The stacking container is another suction device, for example. However, it is also possible for the stacking container to be, for example, a transport container for a machine tool, in particular for an abrasive and/or cutting machine tool, for example a grinding machine or sawing machine. The dust or particles that occur during operation of the grinding machine or sawing machine can be sucked up using the suction device.

It is possible to loosely stack the housing of the electrical device on a stacking container, so to speak, or to stack a stacking container on the housing of the electrical device. The stacking housing and the further stacking container can, however, optionally engage one another in a form-fitting manner using form-fitting contours arranged on the stacking housing of the vacuum cleaner and the stacking container, so that they hold one another in a form-fitting manner transversely to the stacking axis. For this purpose, for example, feet can be arranged on one stacking container or stacking housing and receptacles for the feet can be arranged on the other stacking container or stacking housing supporting or receiving the feet and engaging in one another in a form-fitting manner.

It is advantageous for the electrical device, in particular the suction device, to have coupling means for coupling its housing to a stacking container that is stacked over or stacked underneath along the stacking axis, with the coupling means of the electrical device, the housing being designed to interact with coupling means of the stacking container, so that the housing is firmly connected to the stacking container transversely to the stacking axis and parallel to the stacking axis using the coupling means. The coupling means advantageously comprise rear gripping contours arranged on the stacking container and stacking housing, which can be engaged and disengaged from one another transversely to the stacking axis. Furthermore, the coupling means can comprise, for example, one or more locking elements, in particular at least one pivot bolt and at least one latching projection with which the pivot bolt can be brought into engagement.

Advantageously, the electrical device, in particular the suction device, comprises a container attachment, which can be stacked along the stacking axis as a stacking container on the housing or underneath the housing, wherein the container attachment and the housing have the coupling means for firmly coupling the housing to the container attachment in parallel and transverse to the stacking axis, and wherein the container attachment has a receiving space for at least one component, in particular a suction hose, of the electrical device or the suction device.

The container attachment preferably has a passage opening which is aligned with the suction inlet of the suction device housing when the container attachment is arranged on the suction device housing, the passage opening being provided and designed for pushing through and/or inserting a suction hose.

The suction device advantageously has a dust collection container which is arranged in the dust collecting chamber or which forms the dust collecting chamber and can be removed from the suction device housing and is in particular designed in the manner of a cassette. When the dust collection container is received in the housing, it faces the suction inlet. The suction flow flowing in via the suction inlet can thus flow into the dust collecting chamber of the dust collection container.

An energy storage provided for the power supply preferably comprises an energy storage housing, in the interior of which an arrangement of battery cells for providing electrical energy is arranged.

At least one device interface for detachable connection to an energy storage interface of the energy storage is provided on the housing of the electrical device, the device interfaces and the energy storage interfaces comprising contact arrangements for establishing electrical connections via the interfaces, i.e. the device interface and the energy storage interface.

The energy storage housing has, for example, longitudinal side walls that extend between front side walls. The longitudinal side walls and the front side walls are arranged, for example, between a bottom wall and an interface wall, which lie opposite one another, and which, together with these walls, delimit an interior space of the energy storage housing.

A respective energy storage interface of the energy storage is arranged on the interface wall, with which the energy storage can be connected to a respective device interface of the electrical device.

No electrical contacts are preferably provided on the bottom wall and/or the longitudinal side walls and/or the end walls. Advantageously, the energy storage has electrical contacts only on the interface wall.

In the state received in the energy storage receptacle, the bottom walls of the energy storage housing advantageously lie opposite one another.

It is advantageous if the bottom walls of the energy storages accommodated in the energy storage receptacle extend parallel to one another and/or face one another with their flat sides.

As mentioned, the energy storage receptacle advantageously has side walls lying opposite one another. The interface wall of an energy storage preferably faces one of these side walls of the energy storage receptacle when the energy storage is received in the energy storage receptacle. Furthermore, connecting walls advantageously extend between the opposite side walls. The longitudinal side walls of the energy storage housing are advantageously opposite these connecting walls when the energy storage is accommodated in the energy storage receptacle.

The energy storage advantageously includes a fan for generating a cooling air flow, which can flow into the energy storage housing via an energy storage inflow opening and out of the energy storage housing via an energy storage outflow opening.

BRIEF DESCRIPTION OF THE DRAWINGS

An exemplary embodiment of the invention is explained below with reference to the drawing. In the figures:

FIG. 1 shows a perspective oblique view of a suction device from above, with a suction inlet of the suction device being open, FIG. 2 shows a front part of the suction device according to FIG. 1, roughly corresponding to a detail D1 in FIG. 1, the suction inlet being closed by a closure element, FIG. 3 shows a perspective rear view of the suction device according to FIGS. 1, 2, FIG. 4 shows the suction device according to the previous figures with the suction device housing being open and a removed dust collection container in a perspective oblique view from the front, FIG. 5 shows the arrangement according to FIG. 4, with the dust collection container being received in the suction device housing of the suction device, FIG. 6 shows the suction device according to the previous figures with a container attachment in an oblique frontal perspective.

DETAILED DESCRIPTION

Figure 7:
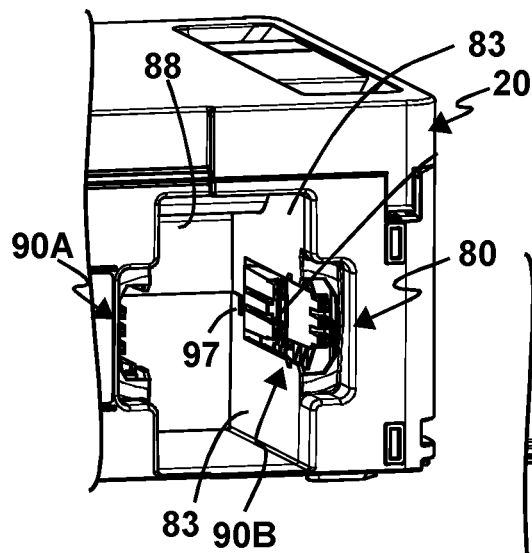
FIG. 7 shows a perspective partial rear view of the suction device according to FIG. 3, with the energy storages removed, roughly corresponding to a section D2 in FIG. 3.
Figure 8:
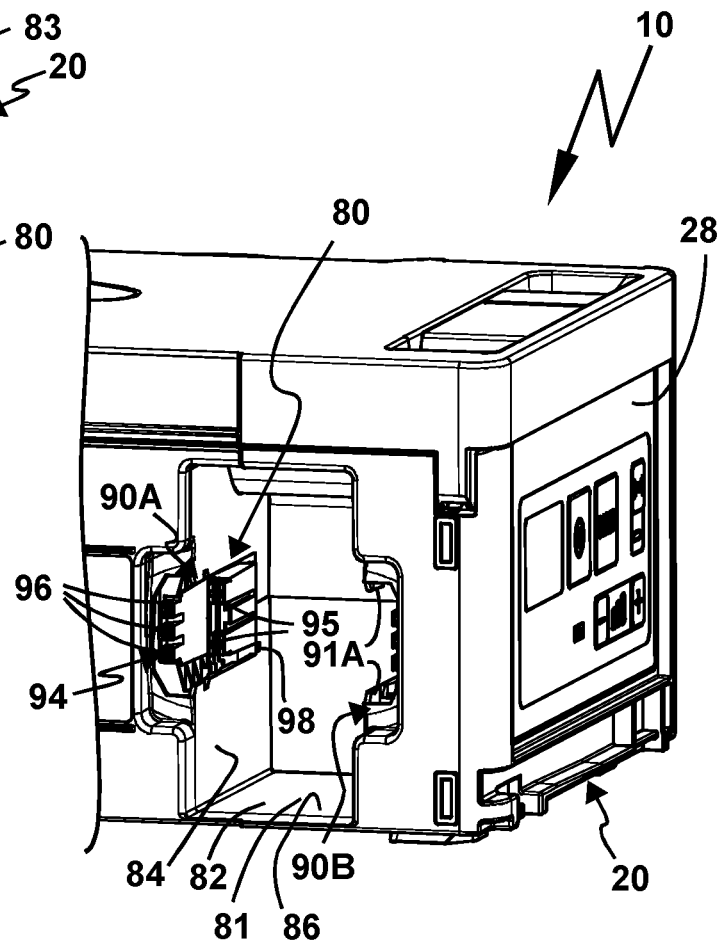
FIG. 8 shows the part of the suction device shown in FIG. 7, but with a different oblique perspective.
Figure 9:
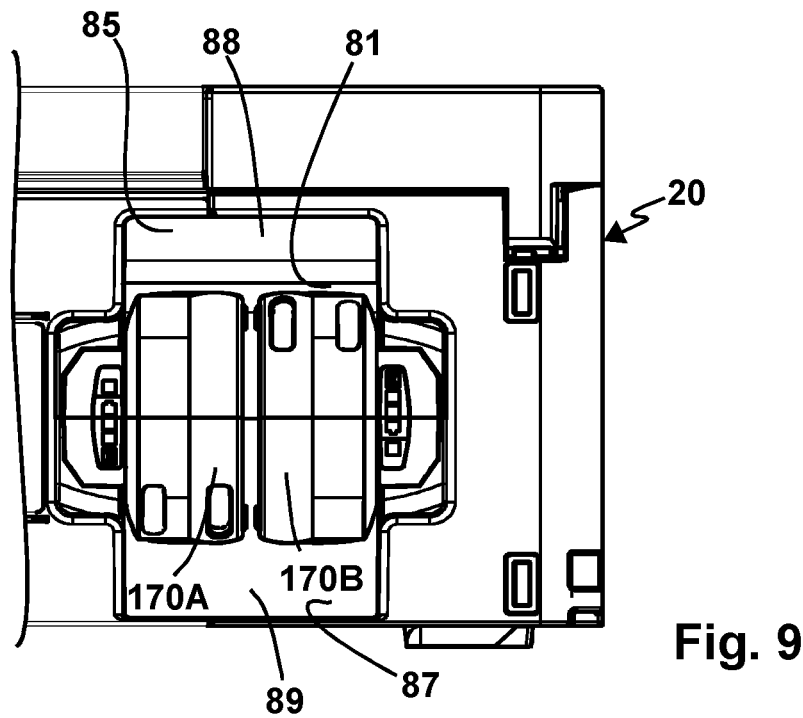
FIG. 9 shows the part of the suction device shown in FIGS. 7 and 8 in a front view with energy storages.
Figure 10:
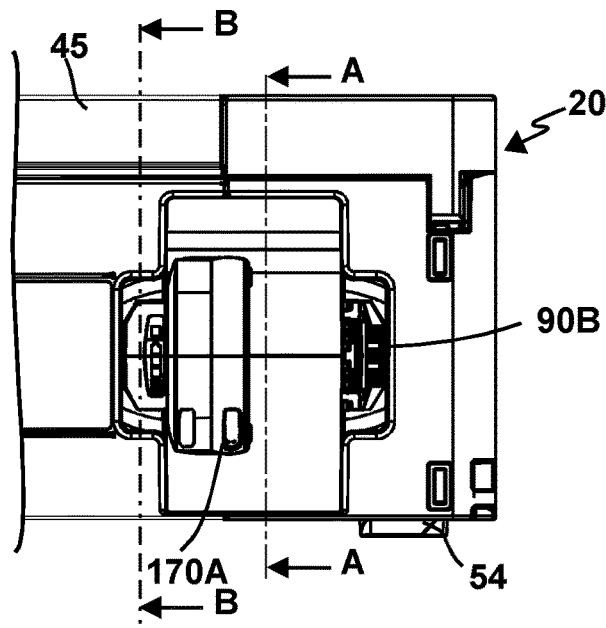
FIG. 10 shows the view corresponding to FIG. 9, but with only one energy storage.
Figure 11:
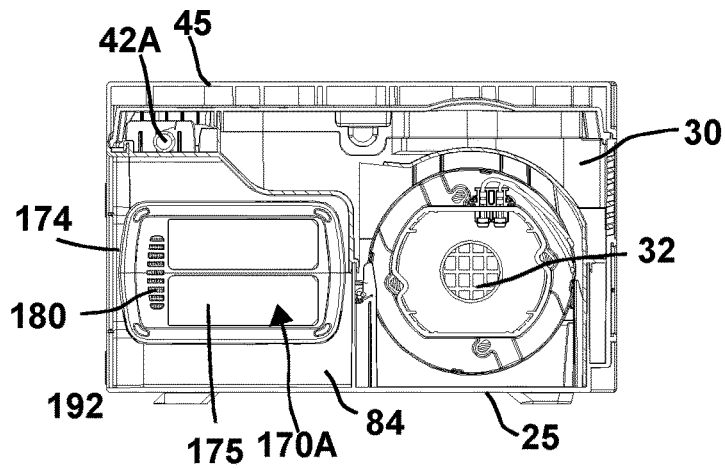
FIG. 11 shows a section through the suction device according to FIG. 10, approximately along a section line A-A in FIG. 10.
Figure 12:
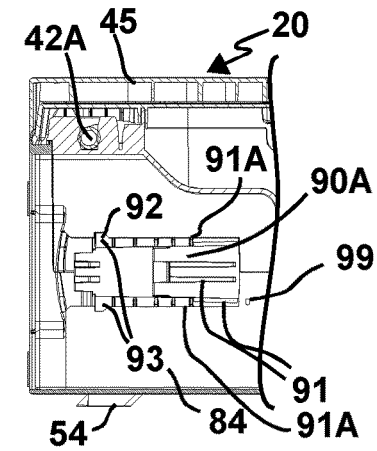
FIG. 12 shows a section through the suction device according to FIG. 10, approximately along a section line B-B in FIG. 10.
Figure 13:
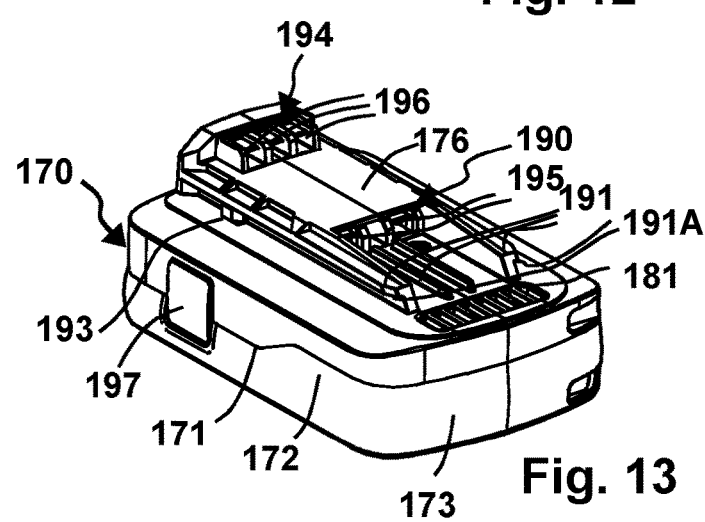
FIG. 13 shows a perspective oblique view of an energy storage of the suction device.
Figure 14:
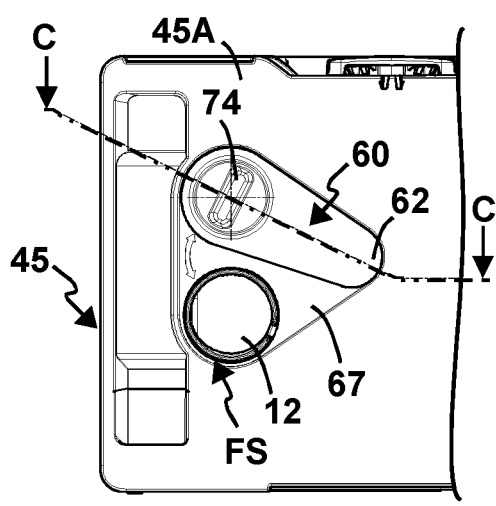
FIG. 14 shows a front view of the suction device from above, roughly corresponding to section D1 in FIG. 1, with the suction inlet being open as in FIG. 1.
Figure 15:
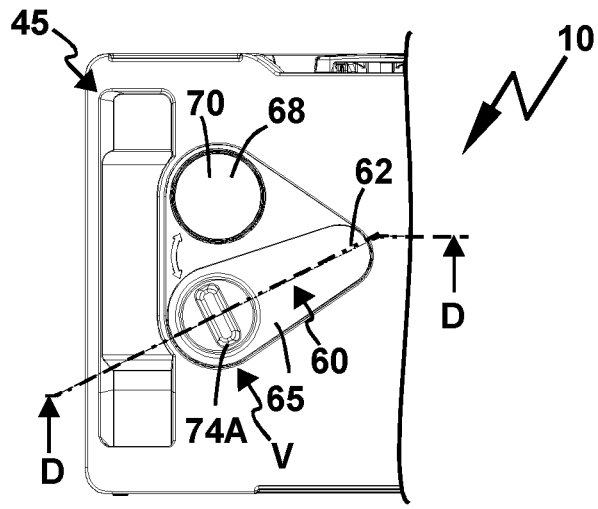
FIG. 15 shows the view corresponding to FIG. 14, with the suction inlet being closed by the closure element.
Figure 16:
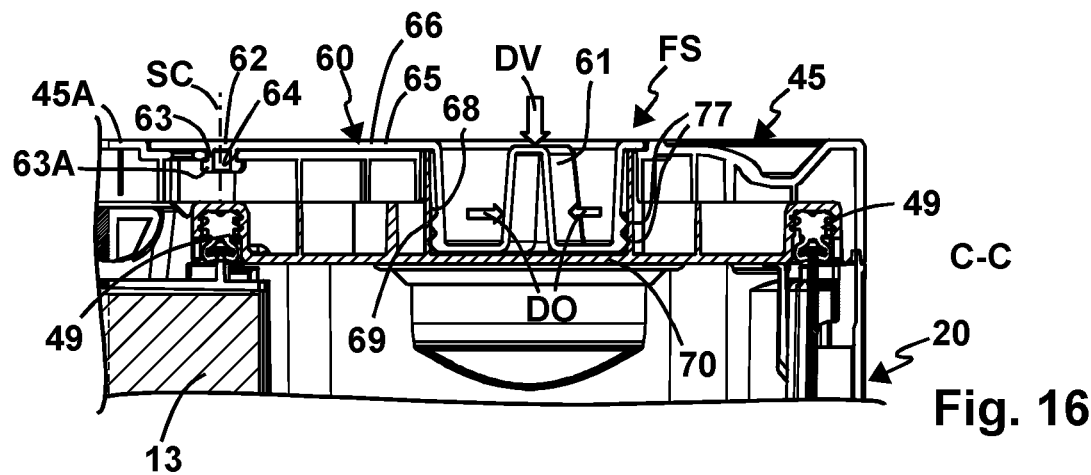
FIG. 16 shows a cross-sectional view through the arrangement according to FIG. 14, approximately along section line C-C in FIG. 14.
Figure 17:
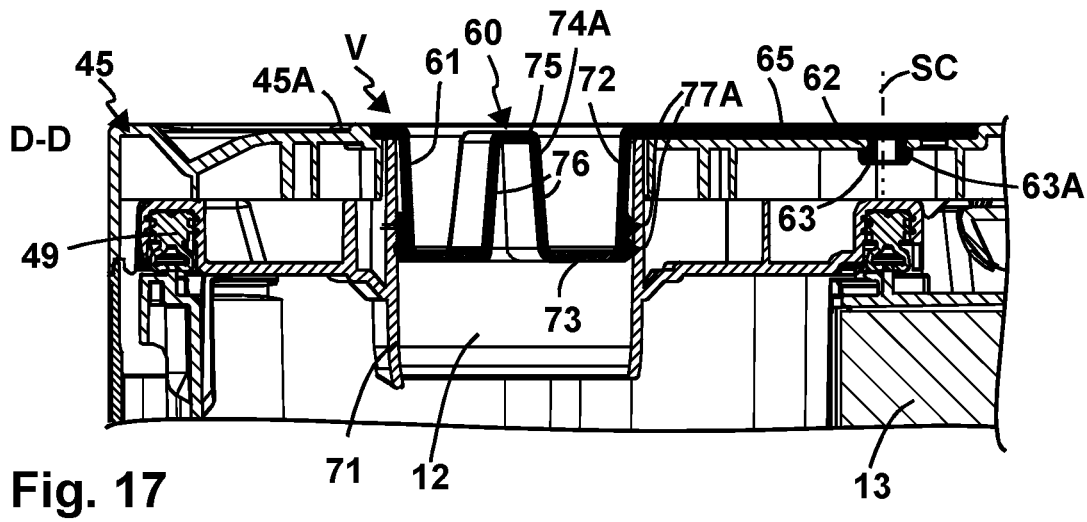
FIG. 17 shows a cross-sectional view through the arrangement according to FIG. 15, approximately along section line D-D in FIG. 15.
Figure 18:
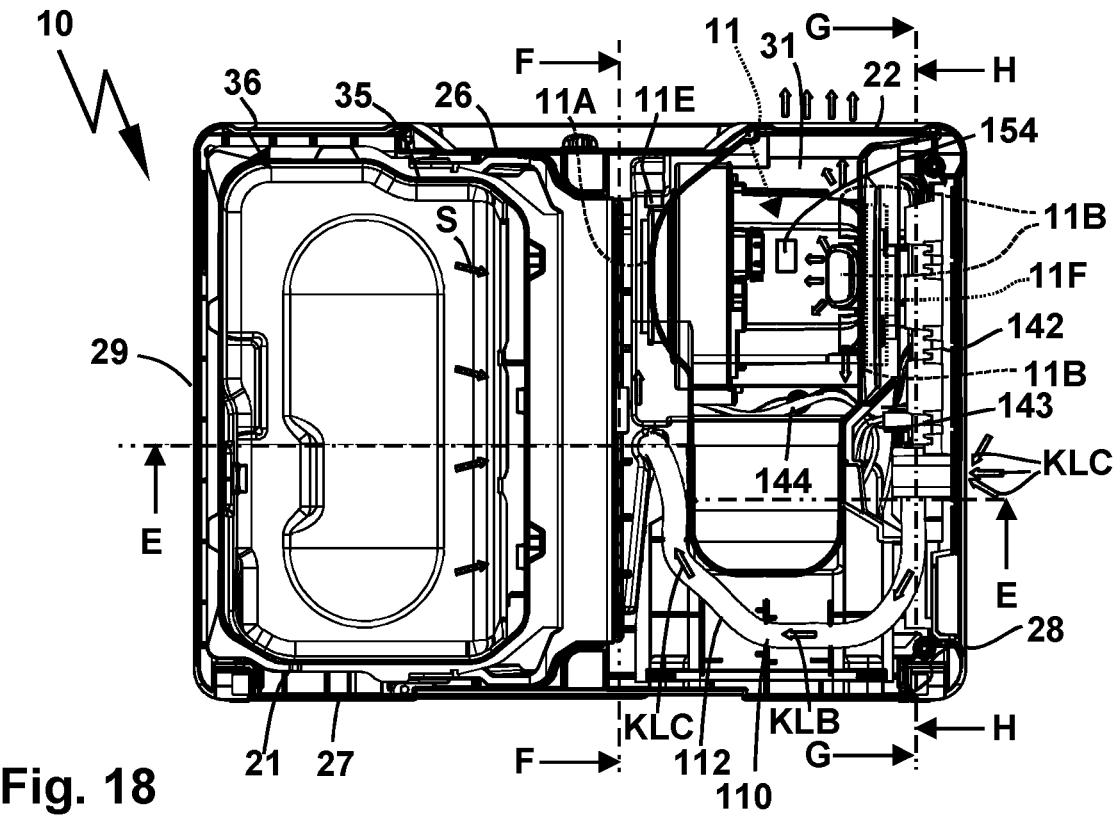
FIG. 18 shows a front view from above of an open lower part of the suction device according to the preceding figures.
Figure 19:
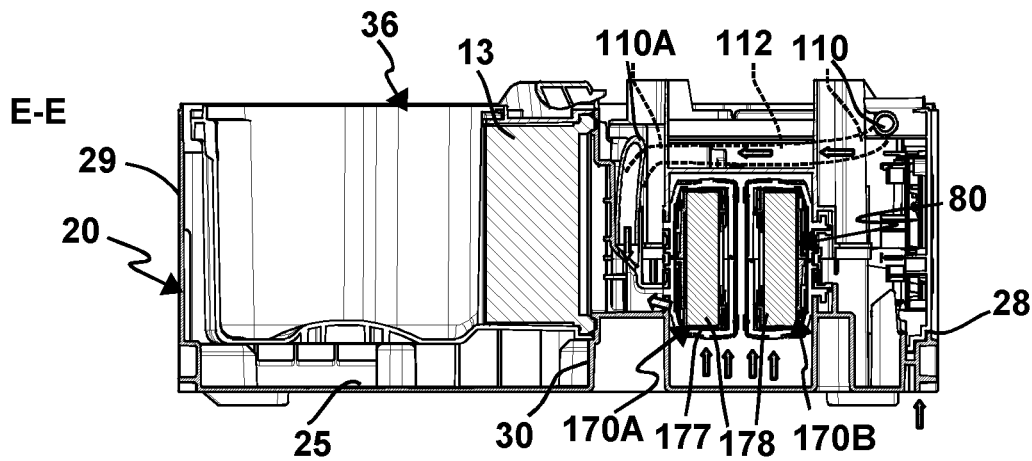
FIG. 19 shows a section approximately along a section line E-E through the lower part of the suction device according to FIG. 18.
Figure 20:
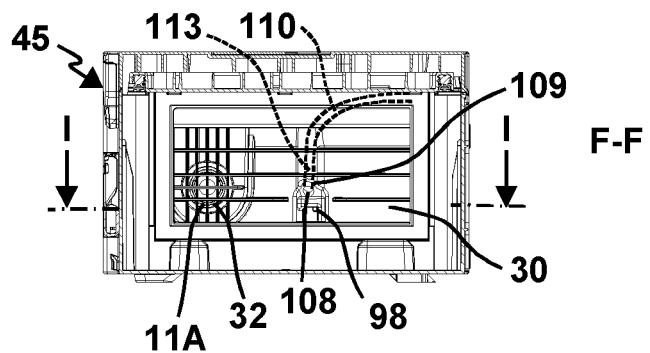
FIG. 20 shows a section through the suction device, approximately along a section line F-F in FIG. 18.
Figure 23:
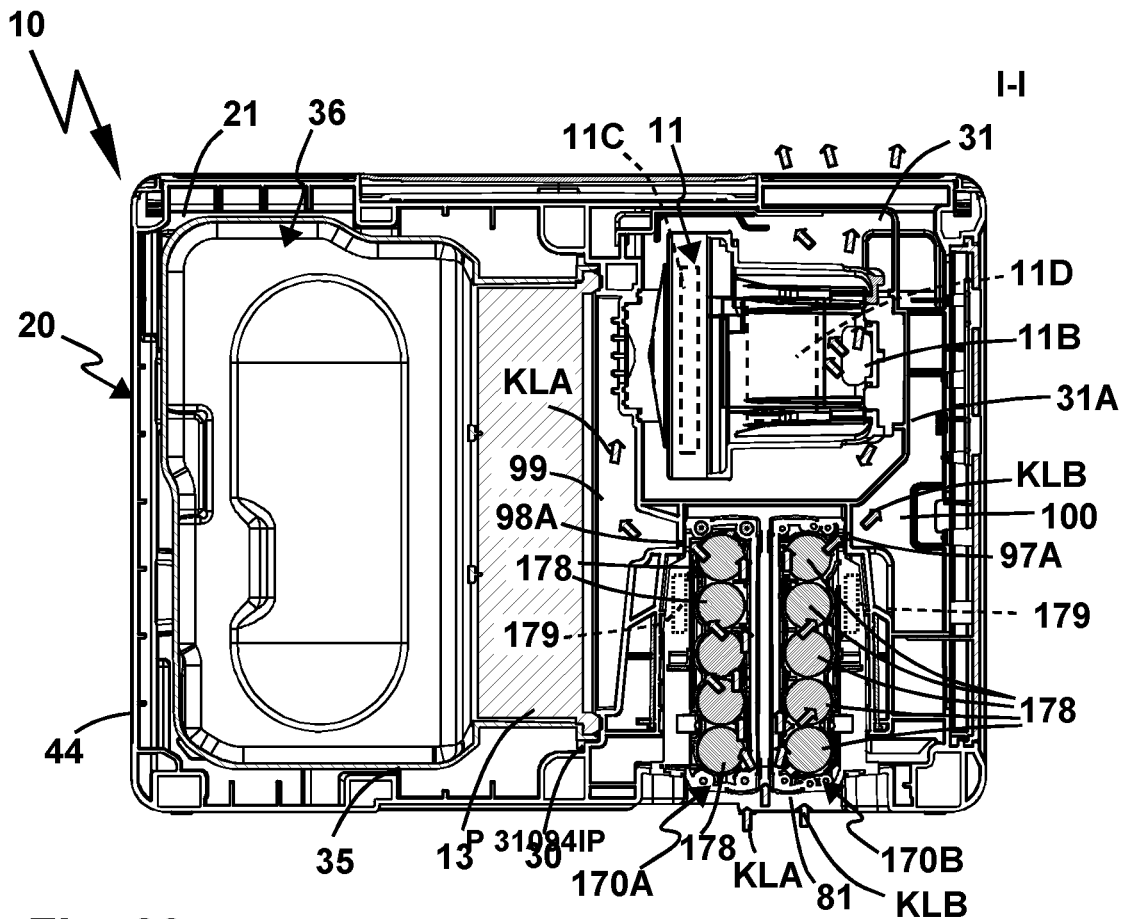
FIG. 23 shows a section through the part of the suction device according to FIGS. 18 to 22, approximately along a section line I-I in FIG. 20.
Figures 21, 22:
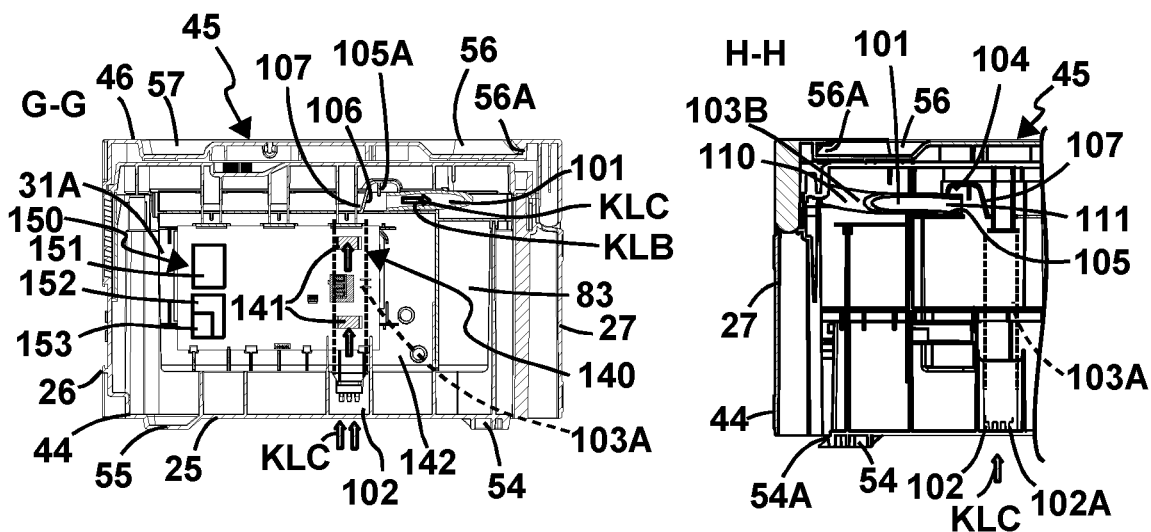
FIG. 21 shows a section through the suction device, approximately along a section line G-G in FIG. 18.
FIG. 22 shows a section through the suction device, approximately along a section line H-H in FIG. 18.
Figure 24:
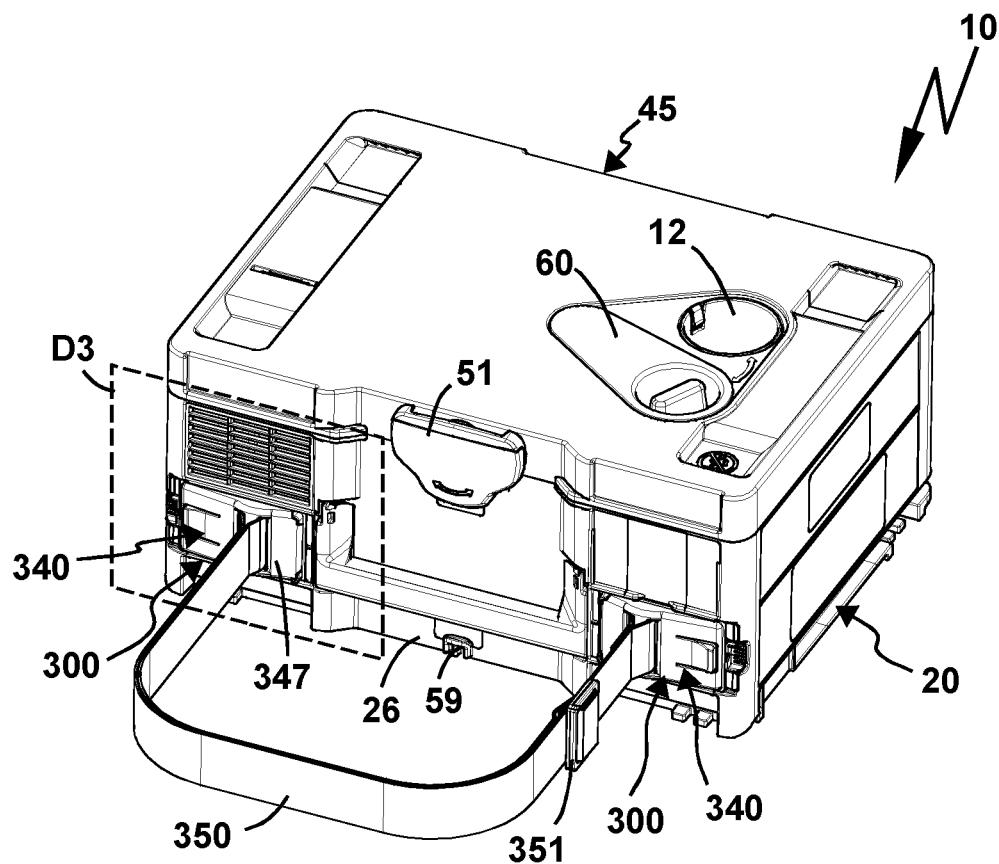
FIG. 24 shows the suction device according to the preceding figures with a carrying strap.
Figure 25:
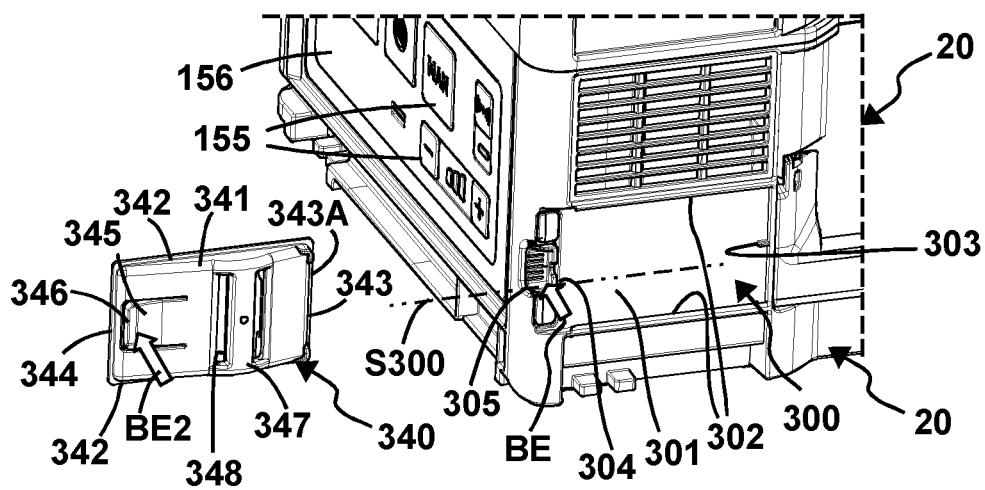
FIG. 25 shows a detail D3 from FIG. 24, but with the carrying strap removed and a fastening device for the carrying strap.
Figure 26:
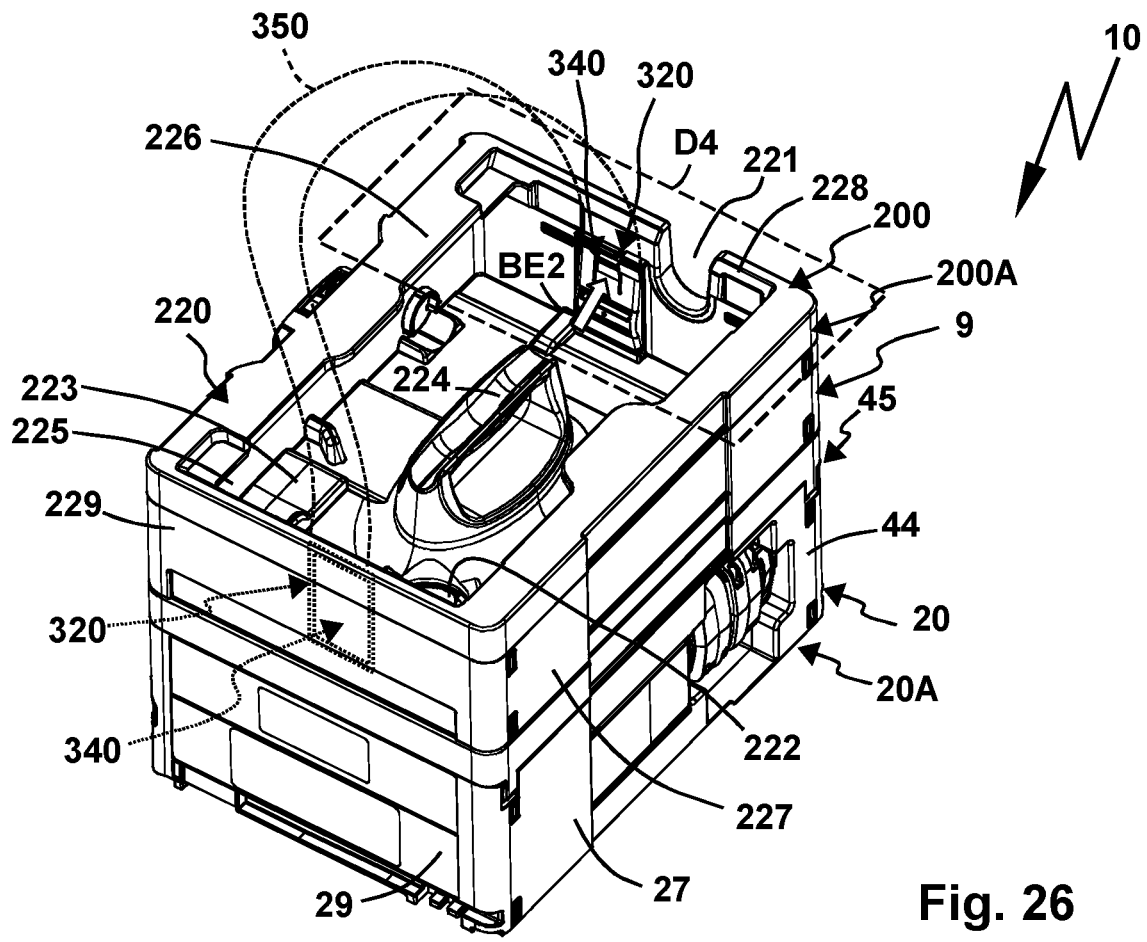
FIG. 26 shows the suction device according to the previous figures with a container attachment in a perspective oblique view, with the carrying strap shown schematically being attached to the container attachment.
Figure 27:
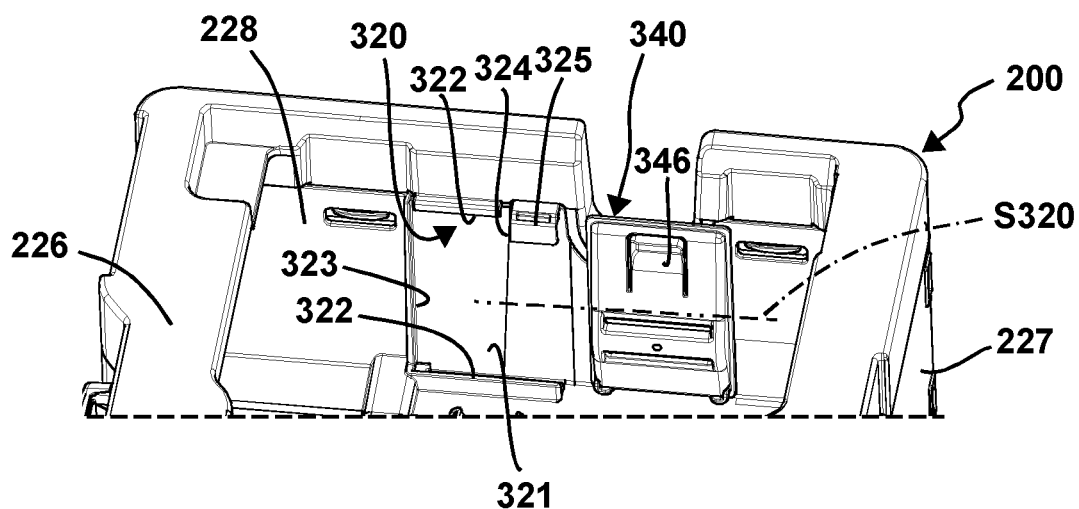
FIG. 27 shows a detail D4 from FIG. 26, the fastening device of the carrying strap being shown in a release position.

A suction device 10 has a suction device housing 20 in which a suction turbine 11 of the suction device 10 is received. A suction flow S can be generated with the suction turbine 11 and can flow into the suction device housing 20 through a suction inlet 12. A suction hose SL can be connected to the suction inlet 12.

The suction flow S flows through a dust collecting chamber 21 of the suction device housing 20, in which particles contained in the suction flow S, for example dust, can be collected. A filter element 13, for example a plate filter, is arranged between the suction turbine 11 and the dust collecting chamber 13, so that particles contained in the suction flow S are retained in the dust collecting chamber 21. The suction flow S flows through the suction turbine 11 downstream of the filter element 13 and flows out of the suction device housing 20 via an air outlet 22.

The suction device 10 is a mobile electrical device, for example, that can be conveniently brought to its place of use. The suction device body 20 is, for example, box-shaped and compact. The features and configurations explained in the following may however be easily used also in a stationary electrical device.

The suction device 10 can be set with its underside 14 on a surface. The suction inlet 12 is arranged on an upper side 15 of the suction device 10 opposite to the lower side 14. Between the lower side 14 and the upper side 15, the suction device 10 or its suction device housing 20 has longer longitudinal sides 16 and 17, of which the longitudinal side 16 forms a front side and the longitudinal side 17 forms a rear side of the suction device 10, for example.

In a housing interior 23 of the suction device housing 20, the dust collecting chamber 21 and a suction turbine part 24 are provided, in which the suction turbine 11 is received.

The suction device housing 20 comprises a bottom wall 25, from which peripheral walls protrude, namely front and rear longitudinal side walls 26, 27 on the longitudinal sides 16 and 17, and longitudinal side walls 28 and 29 on the longitudinal sides 18 and 19, which extend between the longitudinal side walls 26 and 27 and which together enclose the housing interior 23.

An intermediate wall 30 is arranged between the suction turbine part 24 and the dust collecting chamber 21 and divides the housing interior 23 into the suction turbine part 24 and the dust collecting chamber 21.

A through-flow opening 32 for the suction flow S is provided on the intermediate wall 30, through which the suction flow S can flow from the dust collecting chamber 21 in the direction of the suction turbine part 24, which has a suction turbine receiving space 31 in which the suction turbine 11 is received. The intermediate wall 30 could also be described as a bulkhead, which separates the suction turbine part 24 from the dust collecting chamber 21 apart from the through-flow opening 32 and other small outflow openings 98, 108 to be described.

The suction flow S flows out of the suction turbine receiving space 31 via the air outlet 22. The suction turbine part 24 and in particular the suction turbine receiving space 31 are closed by a covering wall 34, while the dust collecting chamber 21 is open on its side opposite the bottom wall 25, for example at the top in the position of use.

The air outlet 22 is arranged, for example, on one of the peripheral walls of the suction device housing 20, for example the front longitudinal side wall 26, although the longitudinal side walls 27 or 28 could also have an air outlet. In any case, it is advantageous if the air outlet 22 is not arranged on the bottom wall 25 and/or on the covering wall 34, both of which are possible in principle.

The dust collecting chamber 21 has a compartment 35 for a dust collection container 36. The dust collection container 36 is used to collect dirt. A filter bag can also be arranged in the dust collection container 36 or the dust collecting chamber 21.

The dust collection container 36 is designed, for example, as a type of cassette or module which can be removed from the suction device housing 20 in order, for example, to empty dust from the dust collection container 36.

The dust collection container 36 has a bottom wall 37, side walls 38 and 39 protruding from the bottom wall and a filter receptacle 40 for the filter element 13, which delimit an interior space 43 of the dust collection container 36. The filter element 13 is opposite the side wall 39. The side walls 38 extend between the filter receptacle 40 and the side wall 39. The side walls 38, 39 and an upper wall of the filter receptacle 40 delimit a receiving opening 41 which is opposite the bottom wall 37. Consequently, the dust collection container 36 is open at the top.

A carrying handle 42 in the manner of a strap is hinged to the side walls 38 by means of pivot bearings 42A, with which the dust collection container 36 can be gripped. When the carrying handle 42 is swung out, it can be grasped by an operator. When the dust collection container 36 is inserted into the receiving compartment 35, the carrying handle 42 can be pivoted in the direction of the filter receptacle 40 so that the carrying handle 42 does not project or only slightly project in front of the receiving opening 41.

Provision is advantageously made for the carrying handle 42 pivoted in the direction of the filter receptacle 40 to lock the dust collection container 36 in the receiving compartment 35. At the same time, the filter element 13 is expediently urged in the direction of the intermediate wall 30 so that a flow connection is established between the interior 43 of the dust collection container 36 and the flow opening 32 and thus the suction turbine 11 via the filter element 13.

The suction turbine part 24 and the dust collecting chamber 21 form part of a lower housing part 44 of the suction device housing 20. The lower housing part 44 can be closed by a cover 45. In the open state of the suction device housing 20 or in an open position OD of the cover 45, the storage compartment 35 is open in order to insert the dust collection container 36 into the storage compartment 35 or to remove it from it.

The cover 45 has a cover body, for example a covering wall 46 which includes a suction turbine portion 47 and a closure portion 48. The suction turbine portion 47 is assigned to the suction turbine part 24 and is located opposite the covering wall 34 when the cover 45 is in the closed state.

The closure portion 48 has a seal 49 with which the interior 43 of the dust collection container 36 can be closed. When the cover 45 is closed, the seal 49 rests, for example, on the end faces of the side walls 38 and 39 and on a side wall delimiting the filter receptacle 40, and in particular on these side walls 38, 39 and the outer circumference of the filter receptacle 40, so that the closure portion 48 tightly closes the dust collection container 36.

The cover 45 can be locked to the lower housing part 44 in a closed position SD of the cover 45 by means of a locking device 50.

The locking device 50 comprises a locking element 51 which is pivotably mounted on the cover 45 and which, in a locking position, engages with a locking element 52 on the lower housing part 44 and can be pivoted into a release position in which it disengages from the locking element 52. The locking element 51 is therefore designed in the manner of a swivel bolt. The locking element 52 is arranged on the longitudinal side wall 26 of the lower housing part 44. The locking element 52 is configured as a latching projection, for example. Corresponding to the front-side arrangement of the locking element 52, the locking element 51 is arranged on a front side of the cover 45 assigned to the front side or front longitudinal side 16 of the suction device 10.

The cover 45 is hinged to the lower housing part 44 by means of pivot bearings 53 and can be pivoted between its open position OD and its closed position SD. The pivot bearings 53 are arranged, for example, on the longitudinal side wall 27, in particular its upper end side or narrow side.

A strap 53A optionally present between the cover 45 and the lower housing part 44, which is fastened, for example, to the covering wall 34 and a wall surface of the closure portion 48 opposite thereto, limits the pivoting of the cover 45 in the direction of its open position OD.

Feet 54, 55 are arranged on the underside 14 of the suction device housing 20, with which the suction device housing 20 can be placed on a surface, but can also be brought into engagement with receptacles 56, 57 with a further suction device housing 20 of a similar suction device 10. The feet 54 and the receptacles 56 are arranged close to the rear longitudinal side wall 27. The receptacles 56 and the feet 54 have rear gripping contours 56A, 54A, which can be engaged and disengaged with one another transversely to a stacking direction or stacking axis SR and when they are engaged with one another, they can then connect in a tension-proof manner, suction device housings 20, which are stacked on top of one another along the stacking axis SR. The rear gripping contours 56A, 54A form components of coupling means 58. The coupling means 58 for coupling stacked containers or suction device housings 20 also include a locking element 59 which is arranged on the housing lower part 44 in the manner of the locking element 52, but not close to the free end face of the longitudinal side wall 26, but close to the bottom wall 25. Furthermore, the locking element 51 also forms part of the coupling means 58. When the locking element 51 of a respective lower container or suction device housing 20 is brought into engagement with the locking element 59 by the locking element 51 being pivoted, the containers or suction device housings 20 are also coupled to one another in the region of the front side or front longitudinal side 16 and thus a tension-proof connection of these suction device housings 20 is produced in the direction of the stacking axis SR or in the stacking direction.

The suction inlet 12 can be closed by a closure element 60.

The closure element 60 has a closure body 61 which can be inserted into the suction inlet 12. The closure body 61 is therefore designed as a plug-in projection or plug-in body.

The closure element 60 is movably mounted on the suction device housing 20 by means of a bearing 62 between a closed position V and a release position FS, the closure element 60 closing the suction inlet 12 in the closed position V and releasing it in the release position FS. In the release position FS, the suction inlet 12 is free or open for arranging, in particular for inserting, the suction hose SL.

The bearing 62 is, for example, a pivot bearing, by means of which the closure element 60 is mounted pivotally about a pivot axis SC. The pivot axis SC is, for example, orthogonal to the top surface of the upper side 45A of the cover 44 or to the top surface of the suction device housing 20.

The bearing 62 includes a bearing projection 63 on the closure element 60 which engages in a bearing receptacle 64 on the upper side 15 of the cover 44. The bearing receptacle 64 is designed, for example, as a passage opening on the cover body or the covering wall 46. The bearing projection 63 penetrates the passage opening. From the bearing projection 63, in particular on its free end region, there is a gripping contour 63A, for example a flange-like latching projection or the like, which grips the cover body or the covering wall 46 on an underside of the cover 45 facing away from the upper side 15, so that the closure element 60 is captive, however is pivotally supported on the cover 45 or the suction device housing 20.

The locking body 61 and the bearing projection 63 are arranged on an arm body 65 of the locking element 60. The arm body 65 extends along a longitudinal axis L60 between the bearing projection 63 and the closure body 61, which are arranged at mutually opposite longitudinal end regions of the arm body 65.

The arm body 65 is preferably plate-like and/or is designed in the manner of a strap.

The cover 45 and thus the suction device housing 20 have a closure element receptacle 67 for the closure element 60. The closure element receptacle 67 is designed as a depression on the upper side 45A of the cover 45. An upper side 66 of the closure element 60 facing away from the upper side 45A of the cover 45 does not protrude in front of the upper side 45A of the cover 45 or does not stay behind this upper side 45A, which case is not shown in the exemplary embodiment, but is an option. Thus, the upper side 45A of the cover 45 is available for stacking another container or suction device housing 20 or also of the container attachment 200, which will be explained below, without the closure element 60 representing an interfering contour.

The closure element receptacle 67 is approximately triangular in plan view, for example, with the bearing 62 being arranged in one corner area of this triangle and the suction inlet 12 and a supply receptacle 68 being arranged in the other corner areas.

The supply receptacle 68 is also designed as a plug-in receptacle and has a peripheral wall 69 and a base 70.

The suction inlet 12 is designed as a plug-in receptacle with a peripheral wall 71 into which either the form-fitting body 61 or the suction hose SL can be inserted.

The locking body 61 protrudes in front of the arm body 65 in the manner of a latching projection and has a peripheral wall 72 and a bottom 73. A handle portion 74 protrudes from the bottom 70 into an interior space delimited by the peripheral wall 72 and forms a handle 74A for grasping the closure element 60.

The closure body 61, preferably the closure element 60 as a whole, consists of a flexible material which, on the one hand, enables a press fit or tight fit in the suction inlet 12 or the supply receptacle 68, but on the other hand also enables easy handling. This is explained below:

For example, the arm body 65 is flexible so that the closure body 61 can be moved out of the suction inlet 12 or the supply receptacle 68 while bending the arm body 65.

Alternatively or additionally, a correspondingly movable mounting or pivotable mounting on bearing 62 would also be possible in order to pivot the closure element 60 not only back and forth about pivot axis SC between supply receptacle 68 and suction inlet 12, but also to pivot the same in engagement or disengagement transversely to pivot axis SC with the supply receptacle 68 and the suction inlet 12. For example, the closure element 60 can be movably mounted in the bearing receptacle 65 about a pivot axis SQ running transversely to the pivot axis SC, so that the closure element 60 can be moved away from the upper side 45A and disengaged from the suction inlet 12 or the supply receptacle 68. For this purpose, for example, the bearing projection 63 can have a significantly smaller diameter than the bearing receptacle 64 and thus have a play transversely to the pivot axis SC in the bearing receptacle 64.

The handle portion 74 includes a base wall 75 from which side walls 76 project. The base wall 75 and side walls 76 form an approximately U-shaped or V-shaped configuration in cross section. The side walls 76 extend between the base wall 75 and the bottom 73 of the closure body 61. The base wall 75 and the bottom 70 are, for example, parallel to one another. The side walls 76 face the peripheral wall 72 of the closure body 61. The side walls 76 are advantageously long enough for the handle portion 74 to extend as far as the arm body 65. For example, the base wall 75 is approximately flush with the arm body 65 and/or with the upper side 45A of the cover 45. This makes it easier to grasp the handle 74A.

On the outer periphery of the peripheral wall 72 of the closure body 61 there is a seal 77, for example in the form of ribs or sealing projections 77A, which rests against the peripheral wall 71 or the peripheral wall 72 in a sealing fit or press fit when the closure body 61 engages in the supply receptacle 68 or the suction inlet 12. Thus, in any case, the closure body 61 is held reliably in the supply receptacle 68 or the suction inlet 12. In particular, the seal 77 seals off the suction inlet 12 when no suction hose SL is inserted, so that no dust or other dirt from the dust collection container 36 or the dust collecting chamber 21 can get into the environment. Nevertheless, the operator easily manages to move the closure element 60 from the supply receptacle 68 into the suction inlet 12 or vice versa.

Insertion into the supply receptacle 68 or the suction inlet 12 is possible, for example, by pressing DV on the base wall 75 of the handle section 74.

However, actuation from the suction inlet 12 or the supply receptacle 68 is also easy to effect despite the press fit of the seal 77 on the peripheral wall 71 or 72. The handle portion 74 can namely be gripped with a clamp-like gripping movement and pulled out of the suction inlet 12 or the supply receptacle 68 counter to the direction of the pressure actuation DV.

For example, the side walls 76 are parallel to one another or, as in the exemplary embodiment, are inclined at a small angle to one another, so that when an operator grips the handle portion 74, he can grip the two side walls 76 in a clamp-like manner and move them towards one another, for example by means of a compression load DO. As a result, portions of the peripheral wall 72 and thus the seal 77 are moved away from the peripheral wall 71 or 72 so that the clamping fit of the closure body 61 on the supply receptacle 68 or the suction inlet 12 is removed or at least become less tight. In addition, it can be advantageous if the side walls 76 yield under pressure when the operator acts on them and form recessed grips, so that handling is made even easier. At this point it should be mentioned that rib structures or similar other gripping structures can of course also be provided on the handle section or handle of a closure element in order to facilitate handling.

The suction device 10 advantageously has a container attachment 200 or is compatible with a container attachment 200. The container attachment 200 preferably has the same contour on its outer circumference as the suction device housing 20. The container attachment 200 can be stacked on the suction device 10, namely its suction device housing 20, and connected to it by using the coupling means 58 already explained.

For example, the container attachment 200 comprises a suction device housing 220 with a bottom wall 225 from which longitudinal side walls 226, 227, 228 and 229 protrude, which altogether delimit a receiving space 223 of the container attachment 200. The receiving space 223 is suitable for receiving the suction hose SL.

A handle 224 receiving space 223 protrudes from the bottom wall 225. The handle 224 is designed like a strap, so that the container attachment 200 attached to the suction device housing 20 serves as a carrying handle for carrying a stack 9 consisting of the suction device 10 and container attachment 200. This forms a suction device housing 20 stack housing 20A. The container attachment 200 forms a stacking container 200A.

At the same time, the suction hose SL can be wrapped around the handle 224 so that it serves as a wrapping aid.

A passage 222 for the suction hose SL is provided on the bottom wall 225 and is aligned with the suction inlet 12 when the container attachment 200 is attached to the suction device 10. Furthermore, a lateral opening 221 for the suction hose SL is provided on the longitudinal side wall 28.

On the longitudinal side wall 226, locking elements 251, 259 are provided as coupling means 58, which are structurally identical to and/or compatible with the locking elements 51 and 59. Thus, for example, the locking element 51 of the suction device 10 can be brought into engagement with the locking element 259 in order to form the stack 9 consisting of the suction device 10 and the container attachment 200 stacked on top.

Feet, not visible in the drawing, corresponding to feet 54 and 55, are provided on the side of the bottom wall 225 facing away from the receiving space 223, which feet can be brought into engagement with the receptacles 56 and 57 of the suction device housing 20, so that in combination with the interlocking locking elements 51 and 259 of the coupling means 58, a secure hold of the container attachment 200 on the suction device 10 can be effected in the direction of the stacking axis SR or in the stacking direction.

However, the coupling means 58 also readily bring about a fixed connection between the container attachment 200 and the suction device housing 20 transversely to the stacking axis SR.

Further containers, for example containers for transporting tools, can be stacked over or stacked underneath of the stack 9, which can be coupled to the container attachment 200 or the suction device housing 20 using coupling means that are compatible with the coupling means 58. For example, the container attachment 200 can also be arranged under the suction device housing 20 and connected to it by means of the coupling means 58 to form a stack. Furthermore, another container attachment 200, not shown in the drawing, or another suction device 10, not shown, can be stacked, for example, on the upper container attachment 200 in FIG. 6 and can be coupled to it to form a stack using coupling means that are compatible with coupling means 58.

In principle, it would now be possible to design the suction device 10 as a suction device that can be operated via a power supply outlet. However, the suction device 10 is not only extremely compact, but can also be used flexibly, in that the suction device 10 has a power supply unit 80 to which energy storages 170, for example so-called battery packs, can be connected.

Two energy storages 170 of the same type, also referred to below as energy storages 170A, 170B, are provided for the power supply.

The power supply unit 80 comprises an energy storage receptacle 81 in the region of the suction turbine part 24. The energy storage receptacle 81 extends between the longitudinal side wall 28 and the intermediate wall 30 over almost the entire distance between the longitudinal side wall 28 and the intermediate wall 30, so that in the energy storage receptacle 81 two energy storages 170 can be arranged.

The energy storage receptacle 81 includes an insertion opening 82 through which the energy storages 170 can be inserted into the energy storage receptacle 81. The insertion opening 82 is delimited by side walls 83, 84, which run next to the side wall 28 of the suction device housing 20 and the intermediate wall 30 of the suction device housing 20, in particular parallel to the same. Extending between the side walls 83 and 84 there is a side wall or connecting wall 85 closer to the cover 45 and a side wall or thick wall 86 closer to the bottom wall 25 or formed by the bottom wall 25. The energy storage receptacle 81 is delimited by a bottom wall 87 which is opposite the insertion opening 82.

Device interfaces 90A, 90B, hereinafter also uniformly referred to as interfaces 90, are arranged on the side walls 83, 84, with which the energy storages 170 can be connected, which have energy storage interfaces 190 that match the interfaces 90.

For example, the interfaces 90, 190 include complementary longitudinal guide contours 91, 191, which can be inserted into one another along a plug-in axis SA. For example, the longitudinal guide contours 91, 191 include longitudinal grooves and longitudinal projections that can engage in one another.

Rear-gripping contours 91A, 191A of the interfaces 90, 191 extend transversely to the respective plug-in axis SA, with which the energy storages 170 can be brought into form-fitting engagement with the device interfaces 90 transversely to the respective plug-in axis SA.

The interfaces 90, 190 can be connected to one another in a form-fitting manner on the basis of the rear-gripping contours 91A, 191A and the longitudinal guide contours 91, 191, apart from a sliding mobility along the respective plug-in axis SA.

Furthermore, the interfaces 90, 190 include latching devices 92, 192 in order to latch the energy storages 170 to the device interfaces 90. The latching devices 92 are designed, for example, as latching receptacles 93 into which the latching projections 193 of the latching devices 192 can engage in a latching manner, so that the energy storages 170 are held in a non-displaceable manner at the interfaces 90 with respect to the plug-in axis SA. The latching projections 193 are, for example, spring-loaded or resilient in the direction of their locking position in which they engage in the latching receptacles 93 and can be disengaged from the latching receptacles 93 against the aforementioned spring loading.

The interfaces 90, 190 include contact arrangements 94, 194 to establish electrical connections between the energy storage 170 and the suction device 10. The contact arrangements 94, 194 include, for example, energy supply contacts 95, 195 with different polarity, for example a positive potential and ground, as well as data contacts 96, 196 for data transmission between the suction device 10 and the respective energy storage 170. Such a data transmission provides, for example, a digital bus data transmission, in particular with an I2C bus.

The energy storages 170 are advantageously structurally identical. Each energy storage device 171 has an energy storage device housing 171, which comprises longitudinal side walls 172 on its longitudinal sides 172A and end-side walls 173, 174 extending between these. Extending between the side walls 172-174 is a bottom wall 175 and, opposite this, an interface wall 176 on which the energy storage interface 190 is arranged. The interface wall 176 can have a stepped shape, such that the data contacts 196 are at a greater distance from the bottom wall 175 than the power supply contacts 195.

Furthermore, the power supply contacts 195 and the data contacts 196 are arranged one behind the other in relation to the plug-in axis SA. For example, the data contacts 196 are arranged at the front along the plug-in axis SA in the plug-in direction, namely closer to the end wall 173, while the supply contacts 195 are arranged to the rear in the plug-in direction along the plug-in axis SA, namely near the end side wall 174. The energy storage housing 171 has an interior 177 in which battery cells 178 are arranged, protected from environmental influences. However, the battery cells 178 heat up, for example, when charging or discharging, namely when the suction device 10 is operated using the energy storage 170. However, the battery cells 178 in the energy storages 170 are actively cooled, for which purpose each energy storage 170 has a fan 179. The fan 179 generates a cooling air flow KL, which flows through an energy storage inflow opening 180 into the interior space 177 and through an energy storage outflow opening 181 out of the latter. For example, the energy storage inflow opening 180 is arranged on the bottom wall 175 while the energy storage outflow opening 181 is arranged on the interface wall 176. In addition, the energy storage inflow openings 180 and the energy storage outflow openings 181 are arranged on opposite longitudinal end regions of the energy storage 170, namely close to the end wall 174 and the end wall 173, so that the cooling air flow KL, for example a cooling air flow KLA in the case of the energy storage 170 and a cooling air flow KLB in the case of the energy storage 170B, flows through a respective energy storage device 170, so to speak, from the back to the front with respect to the plug-in direction or plug-in axis SA.

The device interfaces 90 are arranged on opposite sides of the energy storage receptacle 81, namely on the side walls 83 and 84. Accordingly, the energy storages 170 are received in the energy storage receptacle 81 with bottom walls 175 lying opposite one another.

Operating elements 197 are provided on the longitudinal side walls 172 of the energy storage housing 171 in order to actuate the latching devices 192. An operator can therefore grip the energy storage housing 171 laterally and/or in a clamping manner, so to speak, in order to act simultaneously on the two operating elements 197 arranged on the opposite longitudinal side walls 172, in order to disengage the latching projections 193 from the latching receptacles 93, so that the respective energy storage device 170 is removable from the device interface 90.

The receptacles 81 allow convenient handling, because between the connecting walls 85, 86 and the energy storage devices 170 inserted into the energy storage receptacle 81, there are operating spaces 88 and 89, into which an operator can grasp the operating elements 197, which, for example, have pressure surfaces or have touch surfaces. The control spaces 88 and 89 are, so to speak, uniform or continuous control spaces, because there is no separating component between the energy storages 170 received in the energy storage receptacle 81. If, for example, the energy storages 170 were received in the energy storage receptacle 81 with the energy storage interfaces 190 facing one another, there would have to be an intermediate wall in the energy storage receptacle 81 on which the device interfaces 90 are arranged.

In addition, due to the generous design of the control spaces 88 and 89, the operator can grasp the energy storages 170, for example on their longitudinal side walls 172, in order to remove them from the energy storage receptacle 81. However, this also makes operation easier when inserting the energy storage device 170 into the energy storage device receptacle 81, because in this case too the operator can grasp the longitudinal side walls 172 in order to plug a respective energy storage device 170 into the device interface 90 assigned to it.

The side walls 83, 84 are advantageously spaced apart from one another in such a way that the energy storages 170 connected to the device interfaces 90 have a spacing between their bottom walls 175, so that the cooling air flow KL can flow into the space between the bottom walls 175.

Outflow openings 97 and 98, which are close to the device interfaces 90 and thus arranged close to the energy storage outflow openings 181 of the energy storage 170 on the side walls 83 and 84 of the energy storage receptacle 81 are used for discharging cooling air flows KL of the energy storages 170, which are arranged on the device interfaces 90. The outflow openings 97 and 98 are hereinafter referred to as receptacle outflow openings because of their location in the energy storage receptacle 81 and are located close to the bottom wall 87 such that little or no heat builds up in the energy storage receptacle 81.

The receiving outflow opening 98 opens directly into an intermediate space between the intermediate wall 30 and the filter element 13, so that a cooling air duct 99 is formed between the intermediate wall 30 and the filter element 13, which leads from the receiving outflow opening 98 to the through-flow opening 32 on the intermediate wall 30. Thus, a cooling air flow KLA of the energy storage 170 arranged on the side wall 84 can flow out of the receiving outflow opening 98 and is sucked off by the suction turbine 11 via the cooling air duct 99. In this case, the suction turbine 11 can even intensify the cooling air flow KLA, which is indicated schematically by arrows.

The energy storage 170B can be cooled by a cooling air flow KLB, which can flow out of the energy storage receptacle 81 through the outflow opening 97. The receiving outflow opening 97 forms a duct inflow opening 97A for a cooling air duct 100.

It is easily possible, for example by means of a hose connection line or the like, to fluidically connect the intake outflow opening 97 to the through-flow opening 32 on the intermediate wall 30 or at least to a suction turbine inflow opening 11A of the suction turbine 11, so that the cooling air flow KLB flows directly to the suction turbine 11 or is sucked in by it.

In the present case, however, a different construction has been selected, in which the cooling air duct 100 does not lead directly to the through-flow opening 32, but rather opens into another cooling air duct 101, which is used to cool other components of the suction device 10, for example to cool an energization device 140 and also for a permanent cooling of the suction turbine 11.

The suction turbine 11 is, for example, a so-called through-flow turbine or a turbine which is or can be cooled by the suction flow conveyed by it.

Such permanent cooling of the suction turbine 11 is particularly important when it cannot otherwise suck in sufficient air on the inflow side. Such a situation occurs, for example, when the suction inlet 12 is clogged or blocked, when the filter element 13 is no longer clear, when the dust collecting chamber 21 is overfilled, or the like.

The suction turbine 11 is a so-called flow-through turbine. The suction turbine 11 has the suction turbine inflow opening 11A on its side facing the flow opening 32 and at least one, preferably several suction turbine outflow openings 11B on its side facing away from the flow opening 32.

It is advantageous if a seal 11E is provided between the intermediate wall 30 on the one hand and the end face of the suction turbine 11 which faces the intermediate wall 30 and has the suction turbine inflow opening 11A on the other hand, so that it bears tightly against the intermediate wall 30 and the suction flow S can flow through the through-flow opening 32, but not in the suction turbine receiving space 31 in which the suction turbine 11 is arranged.

The suction turbine receiving space 31 is delimited by a side wall 31A in the region of the suction turbine outflow openings 11B. Between the side wall 31A and the end face of the suction turbine 11, on or next to which the suction turbine outflow openings 11B are arranged, a suction turbine bearing element 11F is advantageously arranged, which is elastically flexible, so that this suction turbine bearing element 11F and the seal 11E hold the suction turbine 11 in the suction device housing 20 in a vibration-damped manner.

The suction turbine 11 has a fan 11C, shown schematically, and an electric drive motor 11D for driving the fan 11C. The drive motor 11D is cooled by the suction flow S during normal operation of the suction device 10, namely when the suction flow S is flowing.

The suction device 10 has an energization device 140 for energizing the suction turbine 11, in particular the drive motor 11D. The energization device 140 includes, for example, one or more power electronic semiconductor elements 141, for example thyristors, MosFets or the like. The semiconductor elements 141 heat up during operation, namely when the suction turbine 11 is supplied with current.

The energization device 140 is arranged on a printed circuit board 104 which is arranged in a sandwich-like manner between the longitudinal side wall 28 and the side wall 83 of the energy storage receptacle 81 of the power supply unit 80. The printed circuit board 104 also partially extends into an intermediate space between the side wall 28 of the side wall 31A. The energization device 140 is connected to the device interfaces 90A, 90B, in particular the energy supply contacts 95, by means of lines 143. Lines 144 connect the energization device 140 to the suction turbine 11.

Furthermore, the suction device 10 advantageously has a controller 150. The controller 150 includes, for example, a processor 151 and memory 152, in which at least one control program 153 for controlling the suction turbine 11, for example, is provided.

An operator can control the suction device 10 using operating elements 155 which are arranged on a control panel 156. The control panel 156 is arranged on the side wall 28.

The controller 150 is electrically connected to the operating elements 155. With the operating elements 155, the suction device 10 can be switched on or off, for example. Furthermore, the power of the suction turbine 11 can be adjustable using the operating elements 155. A display 157 is advantageously provided on the control panel 156, for example to display a status of the suction device 11.

The controller 150 also generates heat, the dissipation of which is advantageously accomplished in the suction device 11, as will become clear below.

The cooling air duct 101 is fluidically connected to the receiving outflow opening 97. Air can thus flow into the cooling air duct 101 via the receiving outflow opening 97, for example the cooling air flow KLB. However, the cooling air flow KLB has already been heated due to the cooling of the energy storage 170B.

Ambient air, that is to say generally cooler air, can flow into the cooling air duct 101 via a duct inflow opening 102 as a cooling air flow KLC. The duct inflow opening 102 is arranged, for example, close to the bottom wall 25 on a region of the longitudinal side wall 28 facing the bottom wall 25. A protective grille 102A is advantageously arranged on the duct inflow opening 102.

The cooling air flow KLC flows via the duct inflow opening 102 into a duct portion 103A of the cooling air duct 101, which runs between the printed circuit board 142 and the side wall 31A. Consequently, the cooling air flow KLC flows behind the printed circuit board 142 or the cooling air flow KLC flows past the printed circuit board 142. In this case, the duct portion 103A is selected such that the cooling air flow KLC essentially flows past the energization device 140, namely in particular past the semiconductor elements 141, which become particularly warm during operation of the suction device 11. However, such heating and, in the worst case, overheating is effectively counteracted using the cooling air flow KLC.

At its end remote from the duct inflow opening 102, the duct portion 103A opens into a hose receptacle 104, in which a hose 110, thus a tubular body 110A for guiding cooling air, is received.

The hose receptacle 104 has, for example, a plug-in receptacle 105 into which the hose 110 is inserted, and an air-guiding surface 106 on a wall 107.

The cooling air flow KLC flowing out of the duct portion 103A is guided into an inlet opening 111 of the hose 110 via the air guiding surface 106. There is a distance between the inlet opening 111 and the air guiding surface 106 or the wall 107 so that the cooling air flow KLC can flow into the inlet opening 111 unhindered.

The design and/or a cross section of the plug-in receptacle 105 ensures that the hose 110 is only compressed to such an extent that it is securely clamped in the plug-in receptacle 105, but is not compressed to such an extent that its flow cross section is no longer sufficient for the cooling air flow KLC to pass through. A plug-in stop 105A is advantageously located opposite the plug-in receptacle 105, against which a jacket of the cooling-air hose 110 can abut when it is inserted into the plug-in receptacle 105. The plug-in stop 105A is at a distance from the air-guiding surface 106. The inlet opening 111 cannot be closed by the air-guiding surface 106 because of the plug-in stop 105A.

The cooling air flow KLB can flow past the circuit board 142 and/or in a gap between the circuit board 142 and the covering wall 34 and also into the inlet opening 111 of the cooling air hose 110, so that the cooling air hose 110 directs both the cooling air flow KLB and the cooling air flow KLC in the direction of the duct outflow opening 108. The cooling air hose 110 thus provides a common duct portion 103B for the cooling air flows KLB and KLC.

The cooling air hose 110 has a hose portion 112, which guides the cooling air flow KLC and/or the cooling air flow KLB past the suction turbine receiving space 31 to a duct outflow opening 108, which is arranged on the intermediate wall 30 and opens out into the space between the intermediate wall 30 and the filter element 13. There, the cooling air flow KLC and/or the cooling air flow KLB can flow in the direction of the through-flow opening 32 in order to be sucked in by the suction turbine 11.

The hose section 112 has an arcuate course. An end region 113 of the tube portion 112 is held in the area of the duct outflow opening 108 in a receptacle 109 which is designed, for example, as a plug-in receptacle.

The cooling air flows KLA, KLB primarily cool the energy storages 170A, 170B, but also the suction turbine 11.

Furthermore, although the cooling air flow KLC cools the power supply unit 140, it also cools the suction turbine 11.

Since smaller cooling air flows are required to cool energy storages 170A, 170B, cooling air ducts 99 and 100 advantageously have smaller flow cross sections than cooling air duct 101. The cooling air duct 101 namely cools the power electronics, e.g. the semiconductor elements 141. This measure contributes to the fact that sufficient cooling air flows through the cooling air duct 101 and not, so to speak, past it through the cooling air ducts 99 and/or 100.

The duct inflow openings 97A, 98A and 102 are permanently open. The cooling air flows KLA, KLB and KLC can thus permanently contribute to the cooling of the suction turbine 11.

Furthermore, a sensor 154 is arranged on the suction turbine 11, the sensor signals of which are evaluated by the controller 150. The sensor 154 includes or is, for example, a temperature sensor and/or pressure sensor and/or flow sensor. Due to the permanent cooling of the suction turbine 11 using the cooling air flows KLA, KLB and KLC, even when the suction flow S is interrupted or not flowing, there is sufficient flow pressure at the sensor 154 so that it can report valid temperature signals to the controller 150.

Finally, controller 150 is designed to monitor a volume flow of suction flow S, for example using the at least one control program 153.

Figure 28:
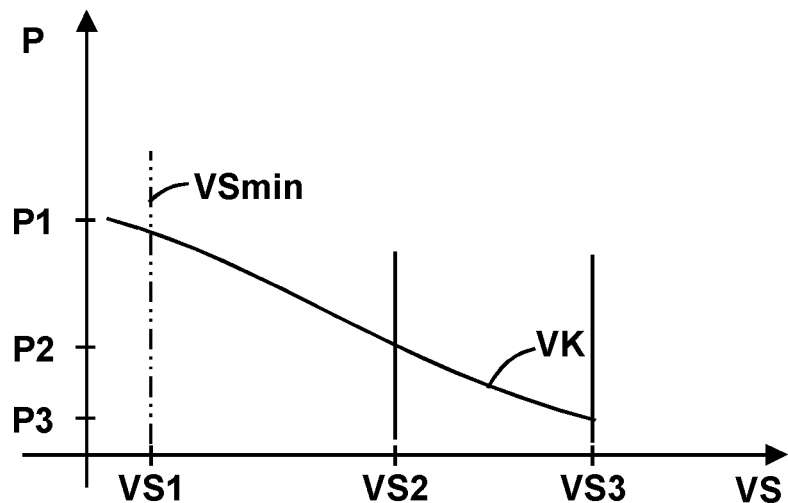
FIG. 28 shows a characteristic curve of a volume flow through the suction turbine of the suction device.
Figure 29:
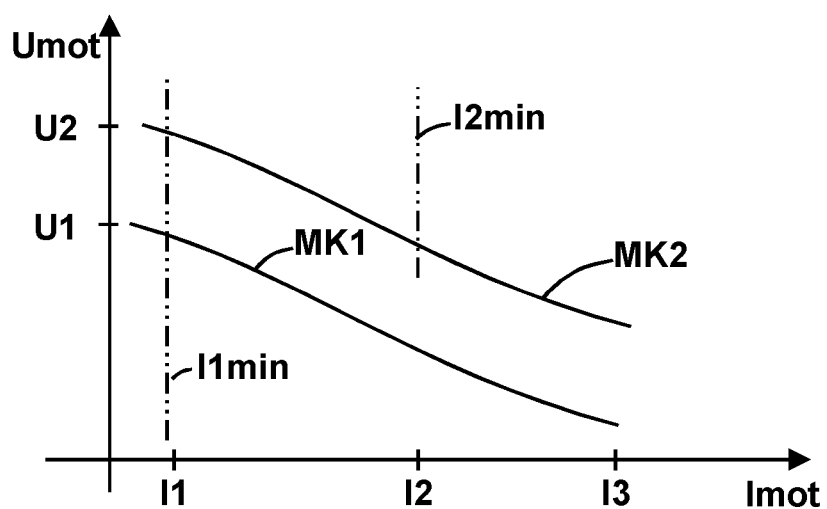
FIG. 29 shows motor characteristics of a drive motor of the suction turbine.

For example, the suction flow S has a volume flow VS, which has a pressure-dependent profile dependent on a pressure P. A characteristic curve VK of a volume flow of the suction flow S is shown schematically in FIG. 28. For example, at pressures P1, P2 and P3 which are negative pressures or underpressures, the volume flow VS has values VS1, VS2 and VS3 in liters per second.

For example, the suction flow S should not fall below a minimum speed of 20 m/s, for example, so that a so-called dust class is fulfilled, according to which the suction device 10 always ensures adequate suction for this dust class.

Depending on the diameter of the suction hose SL, the required minimum speed of the suction flow S results in a minimum value VSmin for the volume flow of the suction flow S, which is approximately 10 l/s for a hose diameter of 27 mm for the suction hose SL.

Due to the constant air flow, which is provided by the cooling air flows KLA, KLB and KLC, among other things, the controller 150 can calculate a characteristic VK of the volume flow of the suction flow S, based on motor characteristics MK1 and MK2 as well as other motor characteristics of the drive motor 11D of the suction turbine 11, not shown in the drawings, because both the characteristic curve VK and the motor characteristics MK1 and MK2 have a substantially constant, in particular substantially linear, profile in the area relevant for monitoring the volume flow or the flow rate of the suction flow S.

The motor characteristics MK1 and MK2 depend on the voltages U1 and U2 with which the drive motor 11D is operated. The motor characteristics MK1 and MK2 are proportional to a current profile of the motor current Imot, with which the drive motor 11D is energized by the energization device 140.

The controller 150, in particular the control program 153, controls the energization device 140 and receives feedback from it, for example, the motor voltage present, for example the motor voltages U1 and U2, and the respective motor current Imot for energizing the drive motor 11D.

If the motor characteristic MK1 or the motor current Imot falls below the value I1min or the motor characteristic MK2 or the motor current Imot falls below the value I2min, which correspond to the minimum value VSmin for the volume flow of the suction flow S, the controller 150 recognizes that the flow rate of the suction flow S is too low and issues a warning on the display 157, for example. In this case, the controller 150 can alternatively or additionally output an acoustic warning to a loudspeaker or other acoustic output means 158.

A carrying strap 350 is advantageously suitable for conveniently transporting the suction device 10 or the stack 9 consisting of the suction device 10 and container attachment 200 or the container attachment 200 alone. The carrying strap 350 can be ergonomically adapted to the respective carrying situation using a length adjustment device 351.

The carrying strap 350 can be fastened either to the suction device 10 or to the container attachment 200. For this purpose, the carrying strap 350 has a fastening device 340 on each of its longitudinal end regions.

The attachment devices 340 can be brought into engagement with attachment receptacles 300 of the suction device 10 or with attachment receptacles 320 of the container attachment 200 as required.

The fastening devices 340 have base bodies 341 which are designed like plates.

The base bodies 341 have rear gripping contours 342 on their longitudinal sides, which, in cooperation with rear gripping contours 302 of the fastening receptacle 300, serve as longitudinal guides along which the fastening devices 340 can be inserted into a respective fastening receptacle 300 along a plug-in axis S300.

In the plug-in direction at the front with respect to a plug-in axis S300, the base body 341 has another rear gripping contour 343, the front portion 343A of which abuts against a stop 303 of the fastening receptacle 300 at the end of the plug-in movement along the plug-in axis S300.

Then a bolt 304 of the fastening receptacle 300, which can be actuated using an actuating surface or actuating contour 305, can reach its locking position, in which it reaches behind and/or over a rear-gripping contour 344 of the fastening device 340.

The bolt 304 is spring-loaded into its locking position, for example, and can be actuated against this spring loading by means of an actuating surface 305 with an unlocking actuation BE in the direction of its release position. The bolt 304 then disengages from the rear gripping contour 344 so that the fastening device 300 can be moved out of the fastening receptacle 300 designed as a plug-in receptacle.

The rear gripping contour 343 and the rear gripping contour 344 extend between the rear gripping contours 342. The rear gripping contour 343 and the rear gripping contour 344 are arranged on opposite longitudinal end regions of the base body 341.

The fastening receptacles 320 are also designed as plug-in receptacles. A fastening device 340 can be inserted into a respective fastening receptacle 320 along a plug-in axis S320 or can be moved out of the fastening receptacle 320 along the plug-in axis S320.

With regard to the fastening receptacle 320, the rear gripping contours 343 and 344 of the fastening device 340 act as longitudinal guide contours which can engage with longitudinal guide contours or rear gripping contours 322 of the fastening receptacle 320 and guide the fastening device 340 along the plug-in axis S320.

One of the rear gripping contours 342 of the fastening device 340, which is at the front in the insertion direction with respect to the plug-in axis S320, abuts against a stop 323 on the bottom or end of the fastening receptacle 320 with respect to the plug-in axis S320. A gripping contour for receiving this gripping contour 342 can optionally be provided there. A bolt 346 of the fastening device 340 can then also engage with a locking contour 324 of a locking element 325 of the fastening receptacle 320, so that the fastening device 340 is locked in the fastening receptacle 320.

The bolt 346 is designed as a resilient tongue or resilient element with respect to the base body 341 and has an actuating surface 345 with which it can be disengaged from the locking contour 324 of the fastening receptacle 320, which is indicated by an arrow or an actuation BE2 in the drawing.

The fastening devices 340 have strap receptacles 347 for the carrying strap 350. The carrying strap 350 can, for example, be pushed through a push-through opening 348 of a strap receptacle 347 and be held in a frictionally engaged manner on the strap receptacle 347 by means of appropriate sling measures.

The fastening receptacles 320 of the container attachment 200 are located on the longitudinal side walls 228 and 229 in such a way that the carrying strap 340 can be brought into engagement with the attachment receptacles 320 bridging the receiving space 223 of the container attachment 200. Thus, the stack 9 can, so to speak, hang down from the carrying strap 350 and be carried comfortably.

The mounting receptacles 300, on the other hand, allow the suction device 10 to be carried in the manner of a shoulder bag. For example, the fastening receptacles 300 are arranged on one of the longitudinal side walls 26, 27, 28 or 29, specifically on the longitudinal side wall 26 in the exemplary embodiment. In any case, it is advantageous if the fastening receptacles 300 are arranged on the narrow sides of the suction device housing 20.

It is advantageous if the fastening receptacle 300 is arranged in longitudinal end regions of the longitudinal side wall 26, namely close to the longitudinal side walls 28 and 29, so that the carrying strap 350 can serve as a strap or carrying handle suitable for hanging on a shoulder in a central portion of the longitudinal side wall 26.

| | | | |
|---|---|---|---|
| 10 | suction device 9 stack | 60 | closure element |
| 11 | suction turbine | FS | release position |
| 12 | suction inlet suction hose SL | V | locking position |
| 13 | filter element | 61 | closure body |
| 14 | lower side | 62 | bearing swivel axis SC |
| 15 | upper side | 63 | bearing projection |
| 16 | long side in front - front side | 63A | rear gripping contour |
| 17 | long side at the back | 64 | bearing receptacle |
| 18 | long side with operating elements | 65 | arm body (65) |
| 19 | long side on the dust collecting chamber | 66 | upper side |
| 20 | suction device housing | 67 | locking element receptacle |
| 20A | stack housing | 68 | supply receptacle |
| 21 | dust collection chamber | 69 | circumferential wall of 68 |
| 22 | air outlet | 70 | bottom of 68 |
| 23 | housing interior | 71 | circumferential wall of 12 |
| 24 | suction turbine part | 72 | circumferential wall of 61 |
| 25 | bottom wall | 73 | bottom of 61 |
| 26 | long side wall in front | 74 | handle portion grip handle 74A |
| 27 | long side wall on the back | 75 | base wall |
| 28 | long side wall with control elements | 76 | side walls |
| 29 | long side wall dust collection chamber | 77 | seal 74A sealing projections |
| 30 | intermediate wall | 78 | |
| 31 | suction turbine receiving space | | |
| 31A | side wall | 80 | power supply unit |
| | | 81 | energy storage receptacle |
| | | 82 | insertion opening |
| 32 | flow-through opening | 83 | side wall to 28 |
| 33 | | 84 | side wall to 30 |
| 34 | covering wall | 85 | connecting wall above |
| 35 | receiving compartment | 86 | connecting wall below |
| 36 | dust collecting container | 87 | bottom wall |
| 37 | bottom wall | 88 | control space above |
| 38 | side walls | 89 | control space below |
| 39 | side wall | 90 | device interfaces |
| 40 | filter receptacle | 91 | longitudinal guide contour plug-in axis SA |
| 41 | receptacle opening top | 91A | rear gripping contours |
| 42 | carrying handle swivel bearing 42A | 92 | latching device |
| 43 | interior of 36 | 93 | latching receptacle |
| 44 | housing lower part | 94 | contact arrangement |

-continued

| | | | |
|---|---|---|---|
| 45 | cover upper side 45A SD and OD | 95 | power supply contacts |
| 46 | cover wall/cover body | 96 | data contacts |
| 47 | suction turbine portion | 97 | receptacle outflow opening at 83 outside |
| | | 97A | duct inflow opening for 100 |
| 48 | closure portion | 98 | receptacle outflow opening at 84 inside |
| | | 98A | duct inflow opening for 99 |
| 49 | Seal | 99 | cooling air duct for 84 through 30 |
| 50 | locking device | 100 | cooling air duct for 83 |
| 51 | locking element/swivel bolt | 101 | cooling air duct labyrinth |
| 52 | locking element/protrusion | 102 | duct inflow opening |
| 53 | swivel bearing for cover | | |
| 54 | feet at back on housing 20 | 102A | protective grille |
| 55 | feet at front on housing 20 | 103A | duct portion rear 105 |
| 56 | rear feet receptacle | 103B | common duct portion |
| 57 | front feet receptacle | 104 | hose receptacle |
| 58 | coupling means | 105 | plug-in receptacle for hose |
| SR | stack axis | 106 | air guiding surface |
| 59 | locking element below = 52 | 107 | Wall |
| | | 108 | duct outflow opening at 32 |
| | | 109 | Receptacle |
| | | 110 | cooling air hose |
| | | 110A | tubular body |
| | | 111 | inlet opening |
| | | 112 | hose portion arcuate |
| | | 113 | end portion |
| | | 140 | energization device |
| | | 141 | semiconductor elements |
| | | 142 | circuit board |
| | | 143 | Lines |
| | | 144 | lines to 11 |
| S | suction flow | | |
| | | 150 | Controller |
| | | 151 | Processor |
| 11A | suction turbine inflow opening | 152 | Storage |
| 11B | suction turbine outflow openings | 153 | control programs |
| 11C | Fan | 154 | sensor on 11/pressure sensor |
| 11D | drive motor | 155 | control element |
| 11E | Seal | 156 | control panel |
| 11F | suction turbine bearing element | 157 | Display |
| | | 158 | output means loudspeaker |
| 200 | container attachment | | |
| 200A | stacking container | | |
| 220 | housing | 170 | energy storage |
| 221 | side passage for SL | 171 | energy storage housing |
| 222 | base passage for suction SL | 172 | longitudinal side wall |
| 223 | 76 receiving space | 172A | longitudinal sides |
| 224 | handle grip | 173 | end side wall plug-in direction at the front |
| 225 | bottom wall | 174 | end side wall plug-in direction to the rear |
| 226 | longitudinal side wall in front | 175 | bottom wall |
| 227 | longitudinal side wall to the rear | 176 | interface wall |
| 228 | longitudinal side wall on the left | 177 | interior space |
| 229 | longitudinal side wall on the right | 178 | battery cells |
| 251 | locking element/swivel bolt | 179 | fan (179) cooling air flow (KLA, KLB, KLC) KL |
| 259 | locking element below = 52 | 180 | energy storage inflow opening |
| | | 181 | energy storage outflow opening |
| 300 | fastening receptacle | 182 | |
| 301 | | 183 | |
| 302 | rear gripping contour lengthwise | 190 | energy storage interface (190A, 190B) |
| 303 | rear gripping contour bottom | 191 | longitudinal guide contours |
| 304 | Bolts | 191A | rear gripping contours |
| 305 | operating surface | 192 | latching device |
| | | 193 | latching projection |
| 320 | fastening receptacle | 194 | contact arrangement |
| 322 | rear gripping contours | 195 | power supply contacts |
| 323 | rear gripping contour bottom | 196 | data contacts |
| 324 | locking contour | 197 | control element for 192 |
| 325 | locking element | 198 | |
| 340 | fastening devices | | |
| 341 | base body | | |
| 342 | rear gripping contour lengthwise | | |
| 343 | rear gripping contour in front | | |
| 344 | rear gripping contour on the back | | |

-continued 345 operating surface
346 Bolts
347 strap receptacle
348 plug-through opening
350 carrying strap
351 length adjustment device

What is claimed is:

1. An electrical device in the form of a suction device or a machine tool, the electrical device comprising:
    an electrical device housing;
    at least one electrical load arranged in the electrical device housing; and
    a power supply unit,
    wherein the power supply unit comprises:
    an energy storage receptacle formed in the electrical device housing; and
    at least one electrical energy storage received in the energy storage receptacle for supplying an electrical power supply to the at least one electrical load,
    wherein the at least one electrical energy storage comprises an electrical energy storage housing having an energy storage interface surface, a bottom surface opposite the energy storage interface surface and an energy storage interface disposed on the energy storage interface surface, and
    wherein the energy storage receptacle is defined by a first side wall, a second side wall facing the first side wall, a top wall extending between the first side wall and the second side wall and a base wall extending between the first side wall and the second side wall, the first side wall, the second side wall, the top wall and the base wall together forming an opening in an outer wall of the electrical device housing, and
    wherein, in an interior of the energy storage receptacle, each of the first side wall and the second side wall has a device interface for a detachable connection of the at least one electrical energy storage, the energy storage interface of the at least one electrical energy storage being detachably connected to one of the two device interfaces, and
    wherein the device interfaces are arranged opposite one another on the first and second side walls of the energy storage receptacle so that the bottom surface of the housing of the at least one electrical energy storage connected to the one of the two device interfaces faces the opposite device interface of the two device interfaces.

2. The electrical device of claim 1, wherein the at least one electrical energy storage comprises two electrical energy storages, wherein the two electrical energy storages can be plugged into the opening of the energy storage receptacle such that the bottom surfaces of the housings of the two electrical energy storages face each other.

3. The electrical device of claim 2, wherein the opening is opposite a bottom of the energy storage receptacle.

4. The electrical device of claim 1, wherein the energy storage receptacle is configured as a singular pocket or a singular compartment on an outer wall of the electrical device housing, wherein a space within the energy storage receptacle is continuous between the first side wall and the second side wall.

5. The electrical device of claim 1, wherein the energy storage receptacle has a depth such that the at least one electrical energy storage projects by a maximum of 10% of a length of the at least one electrical energy storage in front of the energy storage receptacle or an outer contour of the electrical device housing when the at least one electrical energy storage is received in the energy storage receptacle.

6. The electrical device of claim 1, wherein the device interfaces have longitudinal guide contours for guiding engagement of longitudinal guide contours of the energy storage interface of the at least one electrical energy storage along plug-in axes, respectively.

7. The electrical device of claim 1, wherein the device interfaces comprise latching devices for latching a latching device of the energy storage interface of the at least one electrical energy storage, respectively.

8. The electrical device of claim 1, wherein the top wall and the base wall of the energy storage receptacle extend between the opposite first and second side walls to define an interior space for receiving the at least one electrical energy storage.

9. The electrical device of claim 8, wherein, between at least one of the top wall and/or the base wall and the at least one electrical energy storage, an operating space for grasping the at least one electrical energy storage is provided.

10. The electrical device of claim 9, wherein the operating space has a width of at least 1.5 cm.

11. The electrical device of claim 10, wherein the operating space extends continuously between the first and second side walls of the energy storage receptacle.

12. The electrical device of claim 8, wherein, between each of the top wall and the base wall and the at least one electrical energy storage, there is an operating space through which the at least one electrical energy storage can be grasped in a clamping manner on opposite longitudinal sides when the at least one electrical energy storage is received in the energy storage receptacle.

13. The electrical device of claim 1, wherein the at least one electrical energy storage has an operating element on at least one longitudinal side which engages in the energy storage receptacle when the at least one electrical energy storage is received in the energy storage receptacle, wherein, when said operating element is actuated, the at least one electrical energy storage is detachable from the respective device interface in the energy storage receptacle.

14. The electrical device of claim 13, wherein the operating element can be actuated by engaging in an operating space of the energy storage receptacle between the top wall or the base wall and the at least one electrical energy storage.

15. The electrical device of claim 13, wherein the at least one electrical energy storage has the operating element on each opposite longitudinal side.

16. The electrical device of claim 1, wherein the at least one electrical energy storage comprises at least two electrical energy storages and/or wherein the electrical device forms part of a system which comprises the electrical device and at least two energy storages.

17. The electrical device of claim 1, wherein the electrical device housing forms a suction device housing in the interior of which a suction turbine for generating a suction flow is arranged, wherein the suction device housing has a suction inlet for letting in the suction flow, and a dust collection chamber for collecting dust contained in the suction flow, wherein between the dust collection chamber and a suction turbine inflow opening of the suction turbine, a filter element for retaining dust is arranged in the dust collection chamber.

18. The electrical device of claim 1, wherein the electrical device housing is configured as a stack housing designed to form a housing stack extending in a direction of a stack axis, underneath of which at least one stacking container can be stacked and/or atop of which at least one stacking container can be stacked.

19. The electrical device of claim 18, further comprising coupling means for coupling the electrical device housing to the stack container stacked atop or underneath the electrical device housing along the stack axis, the coupling means of the electrical device housing being configured to interact with coupling means of the stacking container, so that the electrical device housing is firmly connected to the stacking container transversely to the stack axis and parallel to the stack axis using the coupling means of the electrical device housing and the coupling means of the stacking container.

20. The electrical device of claim 18, further comprising a container attachment as the at least one stacking container which can be stacked along the stack axis as the at least one stacking container atop the electrical device housing or underneath the electrical device housing, wherein the container attachment and the electrical device housing have a coupling means for firmly coupling the electrical device housing to the container attachment parallel and transverse to the stack axis, and wherein the container attachment has a receiving space for at least one component of the electrical device.

21. The electrical device of claim 1, further comprising a mobile electrical device.

* * * * *